(12) United States Patent
Charras et al.

(10) Patent No.: US 7,152,923 B2
(45) Date of Patent: Dec. 26, 2006

(54) VEHICLE SEAT COMPRISING A BACKREST THAT CAN BE FOLDED DOWN FORWARDS

(75) Inventors: Fabrice Charras, Paris (FR); Jean-François Pierrey, Bourg la Reine (FR); Gérald Thevenot, Chamarande (FR); Yann Reubeuze, Landigou (FR); Jean-Gabriel Saint Supery, Chalo Saint Mars (FR); David Panet, St. Georges des Groseilliers (FR); Emmanuel Lardais, Legast (FR); Xavier Lelaure, Thury-Harcourt (FR); Cédric Legras, La Lande Patry (FR)

(73) Assignee: Faurecia Sieges d'automobile S.A., Nanterre (FR)

( * ) Notice: Subject to any disclaimer, the term of this patent is extended or adjusted under 35 U.S.C. 154(b) by 267 days.

(21) Appl. No.: 10/270,804

(22) Filed: Oct. 15, 2002

(65) Prior Publication Data

US 2003/0080601 A1    May 1, 2003

(30) Foreign Application Priority Data

Oct. 15, 2001  (FR) .................................. 01 13258
Apr. 4, 2002   (FR) .................................. 02 04203

(51) Int. Cl.
    *B60N 2/02*    (2006.01)
(52) U.S. Cl. ............... 297/378.12; 297/341; 297/378.1
(58) Field of Classification Search .......... 297/378.12, 297/341, 378.1
See application file for complete search history.

(56) References Cited

U.S. PATENT DOCUMENTS

| 3,957,312 | A | | 5/1976 | Bonnaud | |
| 5,588,707 | A | * | 12/1996 | Bolsworth et al. | 297/378.12 |
| 5,779,313 | A | | 7/1998 | Rohee | |
| 5,951,108 | A | * | 9/1999 | Bauer et al. | 297/378.12 |
| 6,152,533 | A | * | 11/2000 | Smuk | 297/341 X |
| 6,464,299 | B1 | * | 10/2002 | Castagna | 297/378.12 |
| 6,554,362 | B1 | * | 4/2003 | Pospeshil | 297/378.12 |

FOREIGN PATENT DOCUMENTS

| DE | 25 07 092 | A1 | | 8/1975 | |
| FR | 2 740 406 | A1 | | 4/1997 | |
| FR | 2 746 064 | A1 | | 9/1997 | |
| FR | 2 799 420 | A1 | | 4/2001 | |
| FR | 2 803 803 | A1 | | 7/2001 | |
| JP | 58-199233 | | * | 11/1983 | ........ 297/341 |
| JP | 10-59030 | | | 3/1998 | |

OTHER PUBLICATIONS

International Search Report; FR 0113258 search report dated Jun. 13, 2002.

* cited by examiner

*Primary Examiner*—Anthony D. Barfield
(74) *Attorney, Agent, or Firm*—Marshall, Gerstein & Borun LLP

(57) ABSTRACT

Vehicle seat comprising a cushion and a backrest pivoting with respect to the cushion about a horizontal pivot axis by means of an articulation between a range of erect positions of use, a folded-flat position and an intermediate folded-down position.

This seat comprises a first, a second and a third control member connecting the cushion to the backrest, one of the first, second and third control members being distinct from the other two.

26 Claims, 14 Drawing Sheets

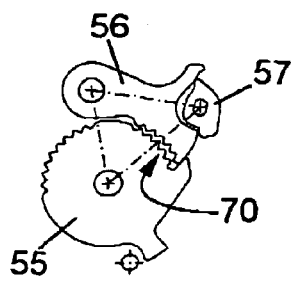
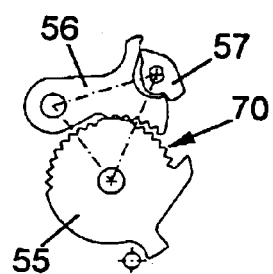
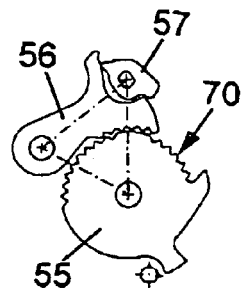
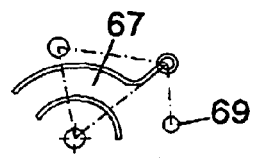
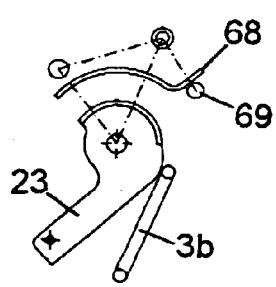
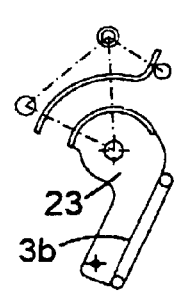
FIG.28.  FIG.29.  FIG.30.
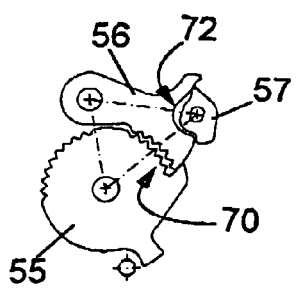
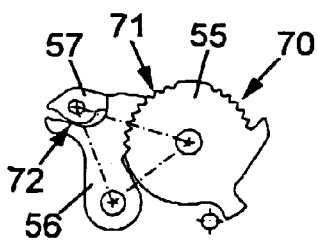
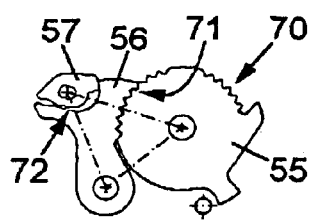
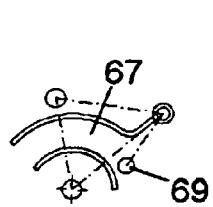
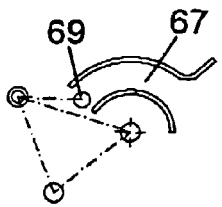
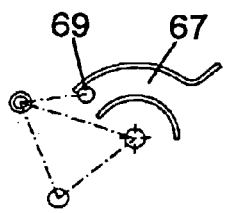
FIG.31.  FIG.32.  FIG.33.

US 7,152,923 B2

VEHICLE SEAT COMPRISING A BACKREST THAT CAN BE FOLDED DOWN FORWARDS

FIELD OF THE INVENTION

The present invention relates to vehicle seats comprising a backrest that can be folded down forwards.

BACKGROUND OF THE INVENTION

More particularly, the invention relates to a vehicle seat comprising:
- a cushion intended to be connected to a floor of the vehicle by slide rails,
- a backrest mounted to pivot with respect to the cushion about a single horizontal pivot axis between a folded-flat position in which the backrest runs roughly horizontally parallel to the cushion and a comfort position in which the backrest extends roughly vertically and allows its user to sit in the seat, this comfort position lying in a range extending angularly between a rear erect position and a forward erect position of the backrest,
- a mechanism for controlling the pivoting of the backrest with respect to the cushion, and which is designed to perform the three functions consisting in:
  - commanding the articulation to adjust the backrest into a comfort position,
  - commanding a tilting of the backrest by rotating it about the pivot axis towards the folded-flat position, and
  - commanding a tilting of the backrest by rotating it about the pivot axis into an intermediate folded-down position between one of the adjusted comfort positions and the folded-flat position, this mechanism comprising an articulation that can be actuated between an unlocked state that allows the backrest to rotate freely with respect to the cushion about the pivot axis and a locked state in which the rotation of the backrest with respect to the cushion is blocked in a comfort position.

Document FR-A-2 746 064 describes one example of such a seat, which is entirely satisfactory from a technical standpoint but which does, however, have the disadvantage that the aforementioned three functions are controlled by a single control member which has to be actuated in a first direction to cause the backrest to move from a comfort position to the intermediate folded-down position, and in a second direction to adjust it into a comfort position and allow the change from the use position to the folded-flat position. The fact that these three functions can be commanded from a single control member makes the task of the user complicated.

SUMMARY OF THE INVENTION

A particular object of the present invention is to alleviate this drawback.

To this end, according to the invention, a seat of the kind in question is characterized in that it further comprises at least two control members separate from one another and acting on the control mechanism so as each to activate at least one of the three aforementioned functions.

By virtue of these arrangements, the seat remains simple because the user actuates at least two different control members to control the various positions of the backrest with respect to the cushion. Each control member activates at most two of the aforementioned three functions and this limits the risk of confusion with regard to the adjustment that is to be made, and the risk of damage to the mechanisms articulating and pivoting the backrest with respect to the cushion should the user force the single control member having not managed to obtain the expected backrest movement.

In a first embodiment of the invention, recourse may also possibly be had to one and/or other of the following arrangements:
- it comprises a blocking mechanism itself comprising:
  - a rotary member, secured to a first seat element chosen from the backrest and the cushion, and
  - a blocking member, actuated by a transmission member and mounted to move on a second seat element, chosen from the cushion and the backrest, different from the one to which the rotary member is secured, the blocking member being movable between, on the one hand, an active position in which it comes into contact with a first stop of the rotary member when the backrest is in the intermediate folded-down position, preventing the backrest from pivoting towards its folded-flat position and, on the other hand, a retracted position in which it no longer interferes with the first stop, the blocking member being urged elastically towards its active position;
- the blocking member is designed to engage with the rotary member, immobilizing the backrest with respect to the cushion when the backrest is in its folded-flat position;
- the rotary member comprises a cam surface designed to actuate a lever, itself designed to lock or unlock the slide rails, and which is mounted to move on the backrest between an active position in which the lever unlocks the slide rails, and a passive position in which the lever allows the slide rails to be locked;
- the lever is urged elastically towards its passive position and the cam surface is designed to move the lever into its active position when the backrest is in its intermediate folded-down position;
- the lever is able to hold the blocking member in its active position, when the backrest is in its intermediate folded-down position;
- the control member activating the tipping of the backrest towards the folded-flat position and the control member activating the tipping of the backrest in the intermediate folded-down position are separate from one another;
- the control member activating the tipping of the backrest towards the intermediate folded-down position is mounted on a location chosen between the articulation and the top of the backrest;
- one of the control members is able to actuate a blocking mechanism situated on the other side of the seat to the articulation.

In a second embodiment of the invention, independent of the first, recourse may also possibly be had to one and/or other of the following arrangements:
- it comprises a blocking mechanism itself comprising:
  - a rotary member, secured to a first seat element chosen from the backrest and the cushion, and
  - a blocking member, mounted to move on a second seat element, chosen from the cushion and the backrest, different from the one to which the rotary member is secured, the blocking member being movable between, on the one hand, an active position in which it comes into contact with a first stop of the rotary member when the backrest is in the intermediate folded-down position, preventing the backrest from pivoting towards its folded-flat position and, on the other hand, a retracted position in which it no longer interferes with the first stop, the blocking member being urged elastically towards its retracted position;

the blocking member is designed to engage with the rotary member, immobilizing the backrest with respect to the cushion when the backrest is in its folded-flat position;

the rotary member comprises a cam surface designed to actuate a lever, itself designed to lock or unlock the slide rails, and which is mounted to move on the backrest between an active position in which the lever unlocks the slide rails, and a passive position in which the lever allows the slide rails to be locked;

the lever is urged elastically towards its active position and the cam surface is designed to move the lever into its passive position when the backrest is in an adjusted comfort position or in its folded-flat position;

the lever is able to hold the blocking member in its active position when the backrest is in its intermediate folded-down position;

the control member activating the tipping of the backrest towards the folded-flat position and the control member activating the tipping of the backrest in the intermediate folded-down position are separate from one another; and the control member activating the tipping of the backrest towards the intermediate folded-down position is mounted on a location chosen between the articulation and the top of the backrest.

In a third embodiment of the invention, independent of the first and second embodiments, recourse may also possibly be had to one and/or other of the following arrangements:

it comprises a blocking mechanism which pivots as one with the backrest in its pivoting about the pivot axis;

it comprises a blocking member and a lever, both mounted to pivot on the backrest, the blocking member being controlled via the control member activating the tipping of the backrest in the intermediate folded-down position, between a retracted position in which it does not interact with the lever and an active position in which it causes the lever to rotate with the backrest when the latter pivots about the pivot axis from a comfort position to the intermediate folded-down position;

the lever, when driven by the blocking member in the pivoting of the backrest from a comfort position to the intermediate folded-down position, commands the unlocking of the slide rails;

the lever blocks the rotation of the backrest in the intermediate folded-down position when it pivots towards the folded-flat position, resting against an element secured to the cushion;

the control member activating the tipping of the backrest towards the folded-flat position and the control member activating the tipping of the backrest in the intermediate folded-down position are separate from one another;

the control member activating the tipping of the backrest towards the intermediate folded-down position is mounted on a location chosen between the articulation and the top of the backrest;

one of the control members is able to actuate a blocking mechanism situated on the other side of the seat to the articulation; and the control member activating the tipping of the backrest towards the folded-flat position and the control member controlling the articulation are coincident.

In a fourth embodiment of the invention, independent of the first three, recourse may also possibly be had to one and/or other of the following arrangements:

it comprises a blocking mechanism which pivots as one with the backrest in its pivoting about the pivot axis;

it comprises a blocking member and a lever, both mounted to pivot on the backrest, the blocking member being controlled via the control member activating the tipping of the backrest in the intermediate folded-down position, between a retracted position in which it does not interact with the lever and an active position in which it causes the lever to rotate with the backrest when the latter pivots about the pivot axis from a comfort position to the intermediate folded-down position;

the lever, when driven by the blocking member in the pivoting of the backrest from a comfort position to the intermediate folded-down position, commands the unlocking of the slide rails;

the lever blocks the rotation of the backrest in the intermediate folded-down position when it pivots towards the folded-flat position, resting against an element secured to the cushion;

the control member activating the tipping of the backrest towards the folded-flat position and the control member activating the tipping of the backrest in the intermediate folded-down position are separate from one another;

the control member activating the tipping of the backrest towards the intermediate folded-down position is mounted on a location chosen between the articulation and the top of the backrest; and the control member activating the tipping of the backrest towards the folded-flat position and the control member controlling the articulation are coincident.

In a fifth embodiment of the invention, independent of the first four, recourse may also possibly be had to one and/or other of the following arrangements:

it comprises a blocking mechanism which pivots as one with the backrest in its pivoting about the pivot axis;

the blocking mechanism comprises a lever mounted to pivot on the backrest designed to command the locking and unlocking of the slide rails;

the lever comprises guide means designed so that the lever is driven, towards its active position in which it causes the unlocking of the slide rails, in the rotation of the backrest from a comfort position towards the intermediate folded-down position so as to prevent the unlocking of the slide rails when the backrest is in the folded-flat position;

the control member activating the tipping of the backrest towards the folded-flat position and the control member activating the tipping of the backrest in the intermediate folded-down position are separate from one another; and the control member activating the tipping of the backrest towards the intermediate folded-down position is mounted on a location chosen between the articulation and the top of the backrest.

BRIEF DESCRIPTION OF THE DRAWINGS

Other aspects, objects and advantages of the invention will become apparent from the detailed description which follows of three embodiments of the invention. The invention will also be better understood from the references to the drawings in which:

FIGS. 28, 29 and 30 depict, in schematic views similar to those of FIGS. 25 to 27, the movement of the main parts of the blocking mechanism of FIGS. 22 to 27, during the tipping of the backrest into the intermediate folded-down position; and FIGS. 31, 32 and 33 depict, in a view similar to that of FIGS. 25 to 30, the movement of the main parts of the blocking mechanism of FIGS. 22 to 30, during the tipping of the backrest 2 into the folded-flat position.

MORE DETAILED DESCRIPTION

In the various figures, the same references denote elements which are identical or similar.

Five embodiments of the seat according to the invention are described hereinbelow. These five embodiments may be implemented independently of one another.

Figure 1:
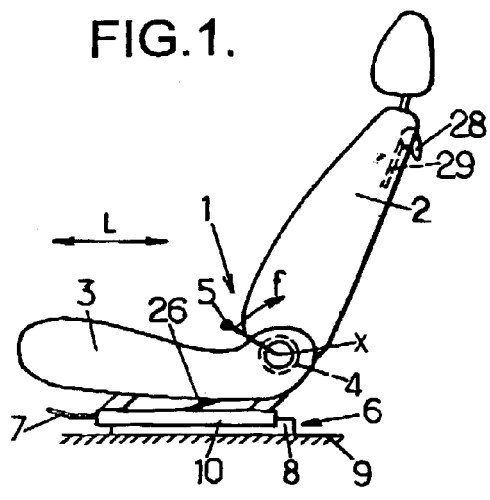
FIG. 1 is a schematic side view of a seat according to a first, a second and a third embodiment of the invention, in a normal position of use.
Figure 2:
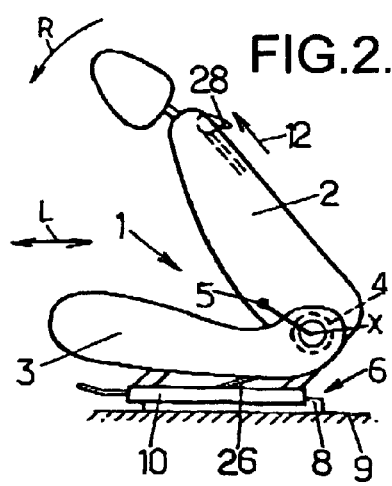
FIGS. 2 and 3 are views similar to FIG. 1, with the seat backrest in an intermediate folded-down position and in a folded-flat position, respectively.
Figure 3:
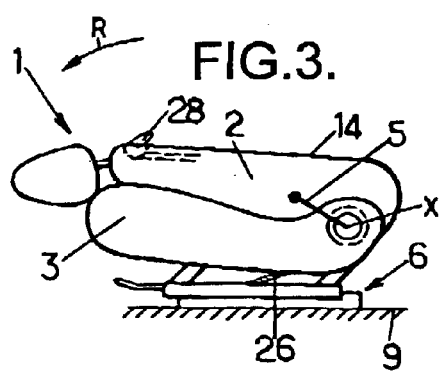

FIGS. 1 to 3 correspond essentially to characteristics which are common to the five embodiments applied hereinbelow.

FIG. 1 depicts a vehicle seat 1, particularly a front seat intended to equip a vehicle which has just two side doors.

This seat 1 comprises a backrest 2 which is mounted to pivot on a cushion 3 about a pivot axis, or folding axis, X, which is horizontal, to adjust the inclination of the backrest in the position of use also known as the comfort position. Angular adjustment of the erect position of use of the backrest is achieved in a range of erect use positions ranging between a backward erect position and a forward erect position of the backrest 2. This adjustment may be achieved by a user using an articulation 4 known per se, controlled by a first control member, for example a rotary handle 5, as in the embodiments set out here, or some other. Examples of such articulations are given, for example, in document FR-A-2 740 406.

The articulation 4 is designed to allow the backrest 2 to rotate with respect to the cushion 3 about the pivot axis X through an angular stroke comprising a notched part on which the user can block the backrest 2 with respect to the cushion 3 in a comfort position, and a free part on which rotation of the backrest 2 with respect to the cushion 3 is unblocked.

The cushion 3 is carried by two parallel slide rails 6, just one of which is visible in FIG. 1, which are normally locked so as to immobilize the seat 1, but which can be unlocked by means of a bar 7 or other operating member (such as the one depicted in FIGS. 4 to 21) to allow the entire seat 1 to slide forwards or backwards in a longitudinal direction L. Each of the slide rails 6 usually comprises a fixed section piece 8 which is secured to the floor 9 of the vehicle and a moving section piece 10 which slides with respect to the fixed section piece 8 and which is secured to the cushion 3 of the seat 1.

To adjust the position of the backrest 1 into the configuration that the user finds most comfortable, he actuates the handle 5, upwards, in the direction of the arrow f. Thus, the handle 5 commands the articulation 4 to disengage it. The user can then incline the backrest 2 further backwards or forwards, between the backward erect position and the forward erect position of the backrest 2, through an angular stroke corresponding to the notched part of the articulation 4. When the backrest 2 is inclined in a position which suits him, the user releases the handle 5, which returns elastically to its initial position. The articulation 4 is once again locked and the tilting of the backrest 2 with respect to the cushion 3 is once again blocked.

It is also possible to fold the seat backrest 2 down into a folded-flat position by causing it to pivot even further forwards in the direction of the arrow R, as depicted in FIG. 3. In this position, the backrest 2 runs roughly parallel to the cushion 3, the rear face of the backrest preferably being rigid enough to act as a bearing surface and thus constitute a shelf.

The first embodiment of the seat according to the invention is described hereinbelow in conjunction with FIGS. 4 to 8.

The tilting of the backrest 2 with respect to the cushion 3 is controlled by a mechanism comprising the articulation 4 situated on one side of the seat 1 and a blocking mechanism 11, situated on the opposite side of the seat 1 to the side on which the articulation 4 is mounted.

The control member for activating the function of adjusting the comfort and the control member for activating the function of tipping the backrest 2 into an intermediate folded-down position are coincident and correspond to the handle 5, while the control member for activating the function of tipping the backrest 2 into the folded-flat position is separate and distinct from the previous one and corresponds to a knob 28.

Figure 4:
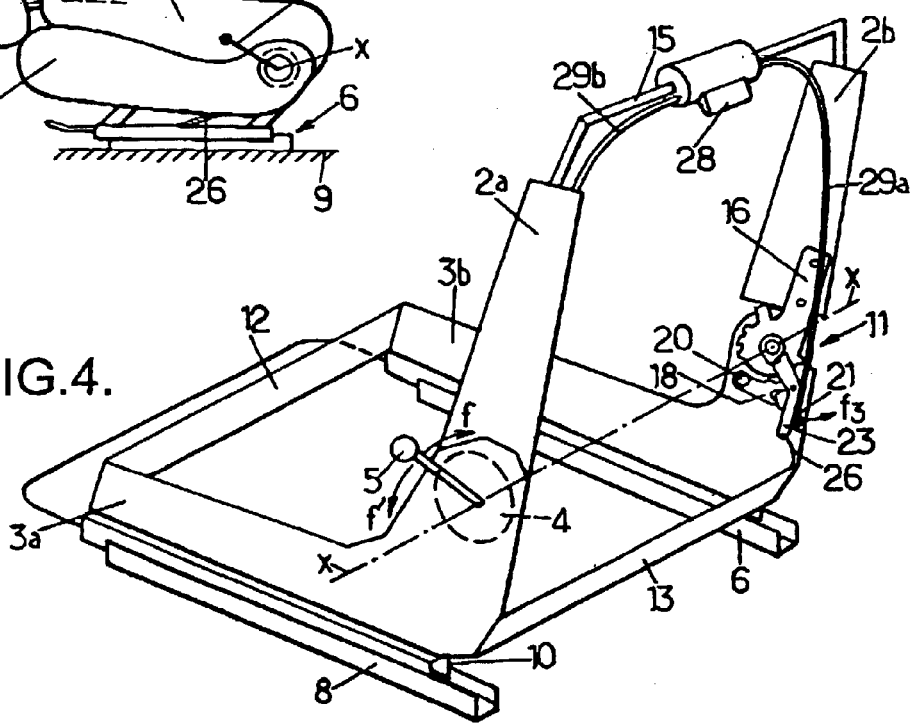
FIG. 4 is a perspective view of the framework of the first embodiment of the seat depicted in FIGS. 1, 2 and 3.

As depicted in FIG. 4, the main metal skeleton of the cushion 3 comprises two first side flanges 3a, 3b connected together by a front 12 and a rear 13 crosspiece. The first side flanges 3a, 3b rest on the slide rails 6. The rotation of the first side flanges 3a, 3b with respect to the second side flanges 2a, 2b is controlled, by, the articulation 4 and the blocking mechanism 11 The articulation 4 and the blocking mechanism 11 are mounted respectively between the first 3a, 3b and second 2a, 2b side flanges coaxially with the horizontal pivot axis X. Furthermore, a crosspiece 15 connects the second side flanges 2a, 2b together and allows these two flanges to pivot simultaneously; there is no connecting shaft between the articulation 4 and the blocking mechanism 11.

The blocking mechanism 11 in this embodiment is illustrated in detail in FIGS. 5, 6, 7, 8 corresponding to various positions of the backrest 2 with respect to the cushion 3.

Figure 5:
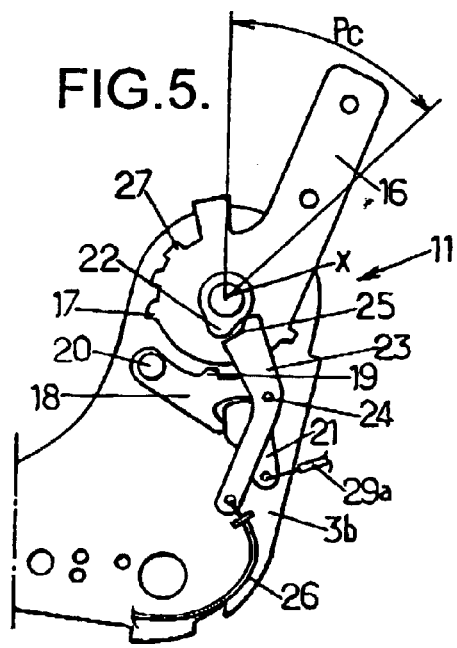
FIG. 5 is a view of the blocking mechanism of the first embodiment of the seat according to the invention, with the seat backrest in the position depicted in FIG. 1.

Thus, FIG. 5 shows the blocking mechanism 11 in the position of the backrest 2 which position is depicted in FIG. 1 (in its range of erect positions, in the backward comfort position).

The blocking mechanism 11 comprises, on the one hand, a rotary member 16 intended to be secured to the side flange 2a, for example by crimping or by welding, and, on the other hand, a blocking member 18 mounted to move on the flange 3b of the cushion 3, about an articulation point 20.

The rotary member 16 is provided with a first stop 17. In the position illustrated in FIG. 5, the blocking member 18 does not interfere with the first stop 17 of the rotary member 16. What happens is that this first stop 17 is angularly offset for a counter stop 19 projecting from the blocking member 18, and the latter stop does not come into contact with the first stop 17 until the rotary member 16 has pivoted about the pivot axis X, as depicted in FIG. 6 for example, then corresponding to the blocking member 18 being in an active position.

In the configuration corresponding to FIG. 5, the blocking mechanism 11 is disengaged and allows the rotary member 16 to rotate freely with respect to the flange 3b of the cushion 3 in a range of adjustment of comfort $P_c$. A user may, in this range, adjust the comfort position of the backrest 2 by the articulation 4 which lies on the other side of the seat 1. The range of adjustment of comfort $P_c$ extends between the backward erect position and the forward erect position.

Figure 6:
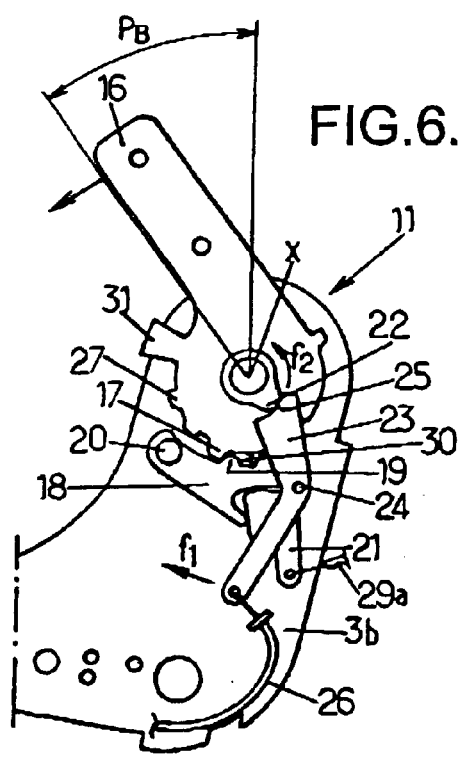
FIG. 6 is a view similar to FIG. 5, with the seat backrest in the position depicted in FIG. 2.

With reference to FIG. 6, the backrest 2 has moved past the forward erect position to come into an intermediate folded-down position designed to allow a user to gain access to the rear seats, particularly to sit on the rear seat or to leave this seat.

To reach this intermediate folded-down position, the user actuates the handle 5 of the articulation 4, in the direction of the arrow f', downwards (see FIG. 1), so as to position this handle in an angular sector corresponding to an unlocked position of the articulation 4 and tips the backrest 2 about the pivot axis X, in a range of tipping $P_B$ forwards, in the direction of the arrow R, as depicted in FIG. 2, until an intermediate folded-down position which exceeds the range of erect positions of use is reached.

The rotational movement of the backrest 2 about the pivot axis X continues until the intermediate folded-down position is reached, which position is fixed as a result of contact between the first stop 17 and the counter stop 19. This tipping is transmitted to the rotary member 16.

The rotary member 16 further comprises a cam surface 22 designed to actuate a lever 23 mounted to move on the first side flange 3b of the metal skeleton of the cushion 3 about an articulation point 24. This lever 23 at one of its ends has a cam follower 25 and at its other end has a cable 26 connected to the bar 7 that controls the slide rails 6.

When the backrest 2 is in the intermediate folded-down position, the slide rails 6 need to be unlocked so that the seat 1 can be translated in the direction L depicted in FIGS. 1 and 2. To this end, as depicted in FIG. 6, the lever 23 is in an active position in which the cam follower 25 is in contact with the cam surface 22 and unlocks the slide rails 6 by virtue of the tension exerted by the cable 26 (conventionally a cable of the Bowden type) on the bar 7, the lever 23 pivoting about its articulation point 24 in the direction of the arrow f1.

According to the first embodiment, in order to reach the folded-flat position from the erect use position depicted in FIG. 1, or from the partially folded-down position allowing access to the rear seats, as depicted in FIG. 2, the user has to actuate a second control member, for example a knob 28, distinct and separate from the handle 5, and arranged for example at the top of the backrest 2, that is to say in the upper half of this backrest 2, as depicted in FIGS. 1 to 3 or more specifically still in the upper part of the rear face of the backrest 2, as depicted in FIG. 4.

The knob 28 is connected via connecting members 29a and 29b, typically Bowden type cables, connected to a transmission member 21 and to the articulation 4, respectively.

Figure 7:
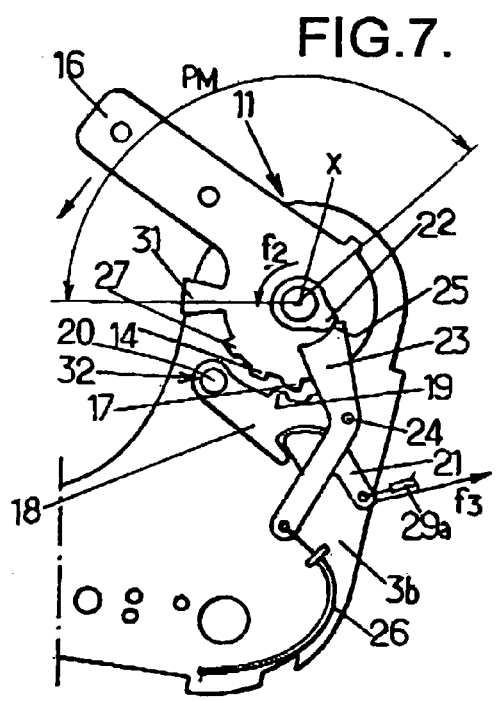
FIG. 7 is a view similar to FIGS. 5 and 6, with the backrest in the position corresponding to the start of the movement towards being folded flat like the seat depicted in FIG. 3.

FIG. 7 depicts the blocking mechanism 11 in a position corresponding to the start of rotational movement of the rotary member 16, from an erect position to the folded-flat position. To reach this position, the knob 28 has to be actuated. The cable 29a then moves the transmission member 21 in the direction of the arrow f3. This transmission member 21 allows the blocking member 18, which is in a retracted position, no longer to interfere with the rotary member 16. The first stop 17 escapes from the counter stop 19 by virtue of the pivoting of the blocking member 18 about its articulation point 20 so that the rotary member 16, which is secured to the skeleton of the backrest 2, can continue its rotational movement about the pivot axis X until the backrest 2 reaches the fully folded-down position. In this rotational movement, which may extend over a range $P_M$, between the backward erect position and the folded-flat position, the blocking mechanism 11 does not interfere with the articulation 4: the latter remains in the unlocked position because of the action of the cable 29b. The arrangements which make it possible to ensure that the articulation 4 remains in the unlocked position are described in detail for example in document FR-A-2 740 406.

Figure 8:
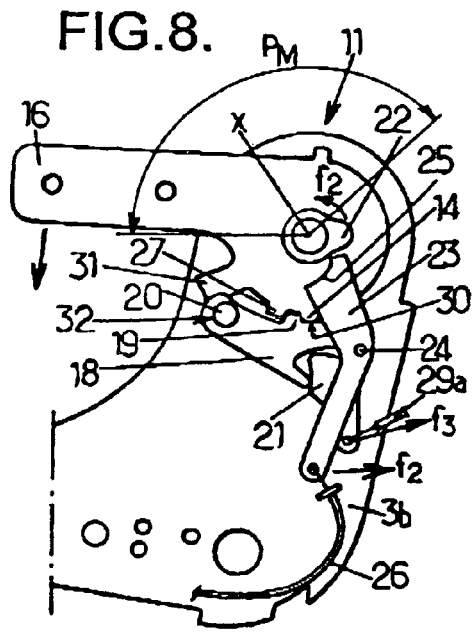
FIG. 8 is a view similar to that of FIGS. 5 to 7, with the backrest in the position corresponding to being folded fully flat as depicted in FIG. 3.

FIG. 8 depicts the blocking mechanism 11 in a position corresponding to the folded-flat position of the backrest 2.

In the folded-flat position, the slide rails 6 are locked. Indeed, because of the pivoting of the rotary member 16, the cam surface 22 pivots in the direction of the arrow f2, releases the lever 23, and places itself in a retracted position in which the cam follower 25 no longer interferes with the cam surface 22. As the lever 23 is urged elastically towards its rest position, the cable 26 relaxes, allowing the slide rails 6 to lock.

When the backrest 2 is in the folded-flat position it has to be locked in a roughly horizontal position and has not to be able to be stood back up in an erect position. For this, the rotary member 16 is provided with a second stop 27 collaborating with the counter stop 19 and with a third stop 14 able to collaborate with a notch 30 formed on the blocking member 18. The notch 30 is situated upstream of the counter stop 19, with respect to the tipping movement of the backrest 2, from the folded-flat position to the erect position.

Likewise, when the backrest 2 is in the folded-flat position, it is preferable for this backrest not to fold down beyond a roughly horizontal position and for it to be able, in this folded-flat position, to withstand a downwards load, for example when a heavy weight is placed on its rear face. To this end, the rotary member 16 has a fourth stop 31 which is reinforced with respect to the first 17 and second 27 stops, which is intended to interfere with a peg 32 situated as a continuation of the rotation axis embodied by the articulation point 20.

To return the backrest 2 of the seat to its normal position of use, the user actuates the knob 28 which therefore pulls on the connecting member 29a, in the direction of the arrow f3. This connecting member actuates the transmission member 21 in such a way as to allow the counter stop 19 of the blocking member 18 no longer to interfere with the third stop 14, thus making angular movement of the rotary member 16 in a direction allowing the backrest 2 to be returned to its use position as depicted in FIGS. 1 and 5 possible. Having reached this use position, the articulation 4 relocks in accordance with the teachings of document FR-A-2 740 406, to fix the position of the backrest 2.

According to an alternative form of this first embodiment, the control member for adjusting comfort and the control member for folding the backrest 2 down into an intermediate position are distinct. In this case, the control member for folding the backrest 2 down in an intermediate position is placed, for example, on the side of the backrest 2, in the upper half thereof, and is connected to the articulation 4 by a cable (in a similar way to that which is described in conjunction with the next embodiment).

The second embodiment is described hereinbelow in greater detail in relation to FIGS. 1 to 3 and 9 to 12.

The seat 1 corresponding to this second embodiment comprises a backrest 2 mounted to pivot on a cushion 3 about a horizontal pivot axis X, and an articulation 4 controlled by a control member, for example a rotary handle 5 (see FIG. 1).

The cushion 3 is carried by two slide rails 6 the unlocking of which can be achieved by means of a bar 7.

The tipping of the backrest 2 with respect to the cushion 3 is controlled by a mechanism comprising an articulation 4 situated on one side of the seat 1 and a blocking mechanism 11 situated on the opposite side of the seat 1 to the articulation 4.

The control member allowing activation of the function of adjusting comfort, that is to say the handle 5, the control member allowing activation of the function of tipping the backrest into an intermediate folded-down position, that is to say a lever 35, and the control member allowing activation of the function of tipping the backrest 2 into the folded-flat position, that is to say a knob 28, are distinct and separate.

Figure 9:
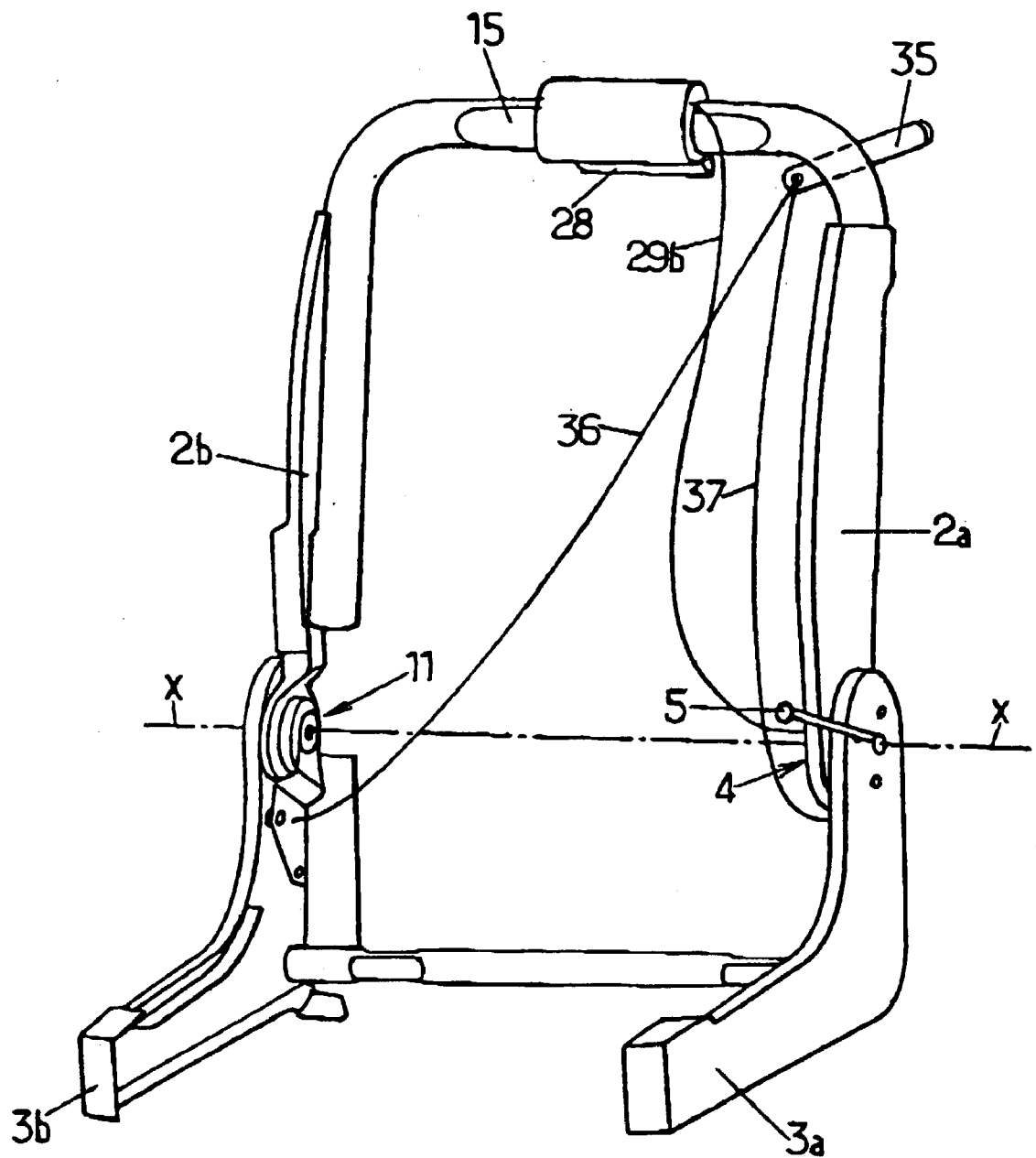
FIG. 9 is a schematic perspective view of the framework of a second embodiment of the seat according to the invention.

As depicted in FIG. 9, the articulation 4 and the blocking mechanism 11 are mounted respectively between first side flanges 3a, 3b of the cushion 3 and second side flanges 2a, 2b of the backrest 2, coaxially with the horizontal pivot axis X. There is no connecting shaft between the articulation 4 and the blocking mechanism 11. However a crosspiece 15 connects the second side flanges 2a, 2b together and allows these two flanges to pivot simultaneously.

The crosspiece 15 carries the knob 28 intended to project at the top of the rear face of the backrest 2, and the lever 35 intended to project on the same side of the backrest 2 as the articulation 4 and the handle 5.

The knob 28 is connected to the articulation 4 by a connecting member 29b (for example a Bowden cable). The lever 35 is connected to the blocking mechanism 11 by another connecting member 36 (for example a Bowden cable) and to the articulation 4 by yet another connecting member 37 (for example a Bowden cable).

The blocking mechanism 11 in this embodiment is illustrated in detail in FIGS. 10a, 10b, 11a, 11b, 12a and 12b which correspond to various positions of the backrest 2 with respect to the cushion 3.

Figure 10A:
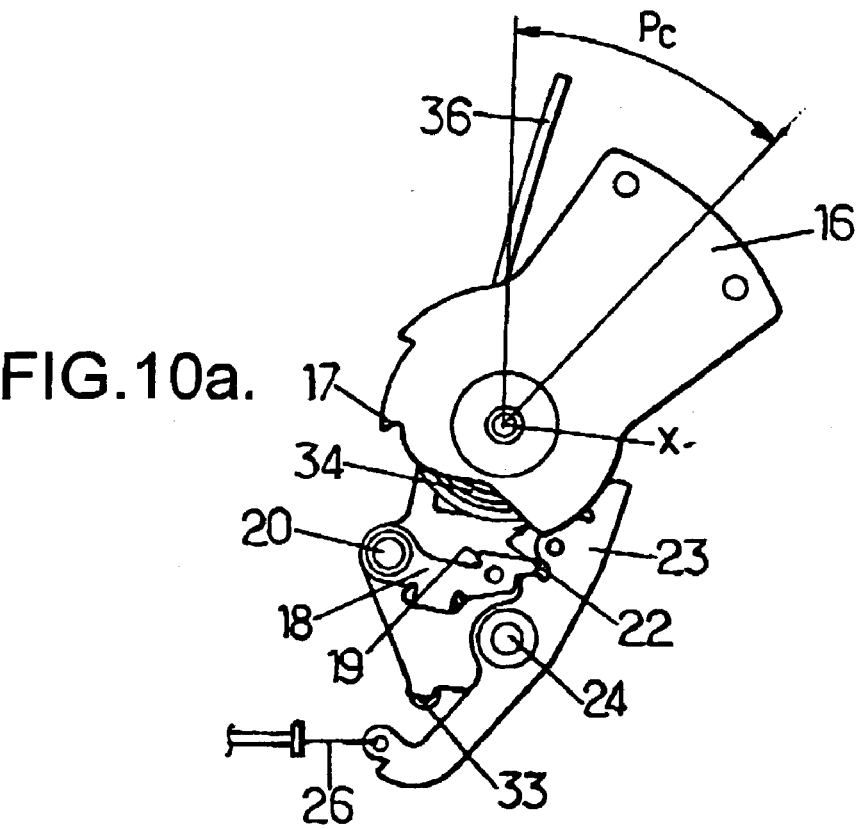
FIGS. 10a and 10b are two side views corresponding respectively to each of the faces of the blocking mechanism of the second embodiment of the seat according to the invention, with the seat backrest in the position depicted in FIG. 1.
Figure 10B:
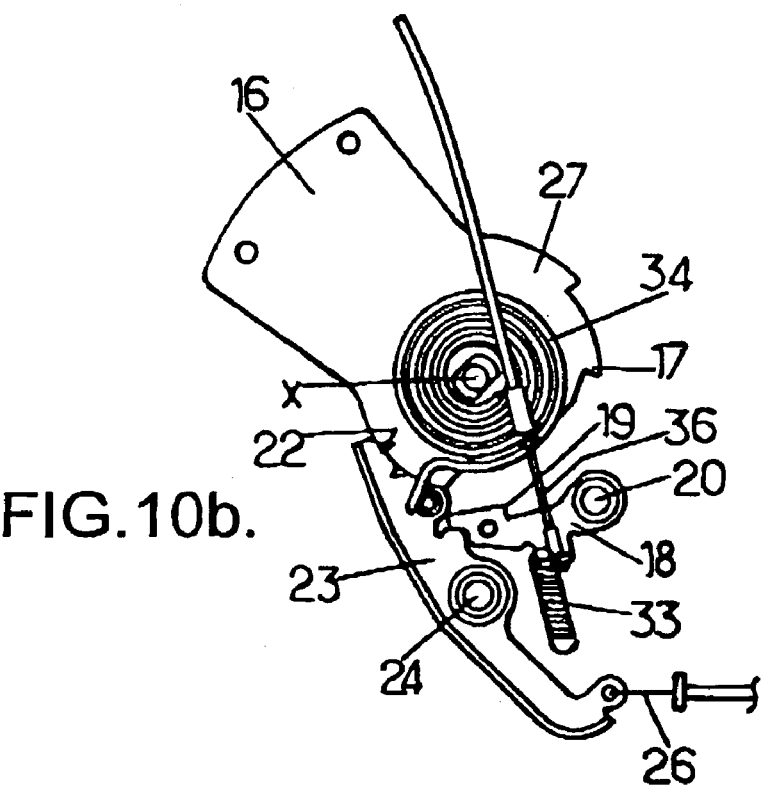

Thus, FIGS. 10a and 10b show the blocking mechanism 11 in the position of the backrest 2 which is depicted in FIG. 1 (in its backward comfort position).

The blocking mechanism 11 further comprises a rotary member 16 intended to be secured to the side flange 2b, for example by crimping or welding, and, on the other hand, a blocking member 18 mounted to move on the flange 3b of the cushion 3 about an articulation point 20.

Figure 11A:
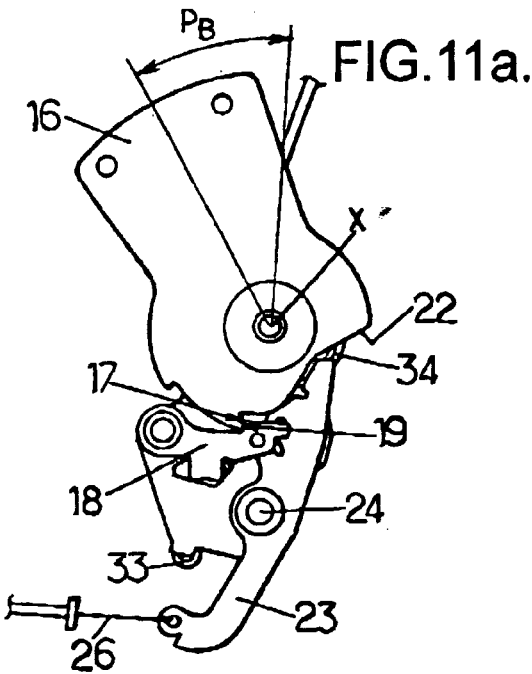
FIGS. 11a and 11b are two side views corresponding respectively to each of the faces of the blocking mechanism of the embodiment of the seat corresponding to FIGS. 10a and 10b, with the seat backrest in the position depicted in FIG. 2.
Figure 11B:
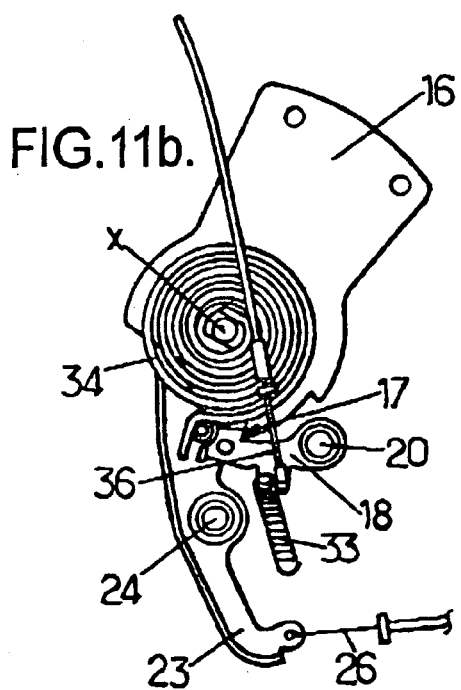

The rotary member 16 is provided with a first stop 17. In the position illustrated by FIGS. 10a and 10b, the blocking member 18 does not interfere with the first stop 17 of the rotary member 16. Indeed, this first stop 17 is angularly offset from a counter stop 19 projecting from the blocking member 18. The counter stop 19 does not come into contact with the first stop 17 until the rotary member 16 has pivoted about the pivot axis X, as depicted in FIGS. 11a and 11b, for example, which correspond to an active position of the blocking member 18 and to the intermediate folded-down position of the backrest 2.

In the configuration corresponding to FIGS. 10a and 10b, the blocking member 18 is in a retracted position, in which position it is urged elastically by a spring 33.

The rotary member 16 comprises a cam surface 22 designed to actuate a lever 23. This lever 23 is mounted to pivot about an axle 24 situated between a first end collaborating with the cam surface 22 and a second end connected to a cable 26 actuating the bar 7. As depicted in FIG. 10b, a spring 34 elastically urges the lever 23 towards an active position. However, in the position corresponding to FIGS. 10a and 10b, that is to say in a position of adjustment of comfort, the cam surface 22 is designed to keep the lever 23 in a passive position in which it does not urge the cable 26.

The blocking member 18 is urged elastically by the spring 33 towards a position in which it keeps the lever 23 in its passive position.

In this configuration, the blocking mechanism 11 is disengaged and allows the rotary member 16 to rotate freely with respect to the flange 3b of the cushion 3 throughout the range of adjustment of comfort $P_c$, in which only the articulation 4 controls the position of the backrest 2 with respect to the cushion 3.

FIGS. 11a and 11b depict the blocking mechanism 11 in a configuration corresponding to the intermediate folded-down position allowing access to the rear seats. To bring the backrest 2 into the corresponding position, the user has, using the lever 35 and the connecting members 36 and 37, on the one hand, unlocked the articulation 4 on one side and, on the other hand, urged the blocking member 18 upwards, that is to say by imposing a force contrary to the action of the spring 33. The unlocking of the articulation 4 allows the user to tip the backrest 2 in the direction of the arrow R (see FIG. 2). Actuation of the blocking member 18 releases the latter from the lever 23, allowing the latter to follow the cam surface 22. The cam surface 22 is designed so that the lever 23, under the action of the spring 34, pivots about the articulation point 24 and pulls on the cable 26 which thus unlocks the slide rails 6.

In this configuration which corresponds to the intermediate folded-down position of the backrest 2, the blocking member 18 is kept in its active position corresponding to pulling of the cable 26, by the lever 23.

The first stop 17 of the rotary member 16 comes into contact with the counter stop 19 of the blocking member 18, thus preventing the backrest 2 from pivoting towards its folded-flat position.

The return of the backrest 2 by the user to a use position causes movement of the lever 23 against the action of the spring 34 along the cam surface 22 thus returning the lever 23 to its passive position in which it locks the slide rails 6.

The blocking member 18, under the action of the spring 33, then returns to the position it occupied in the configuration corresponding to FIGS. 10a and 10b, to keep the lever 23 in the passive position.

Figure 12A:
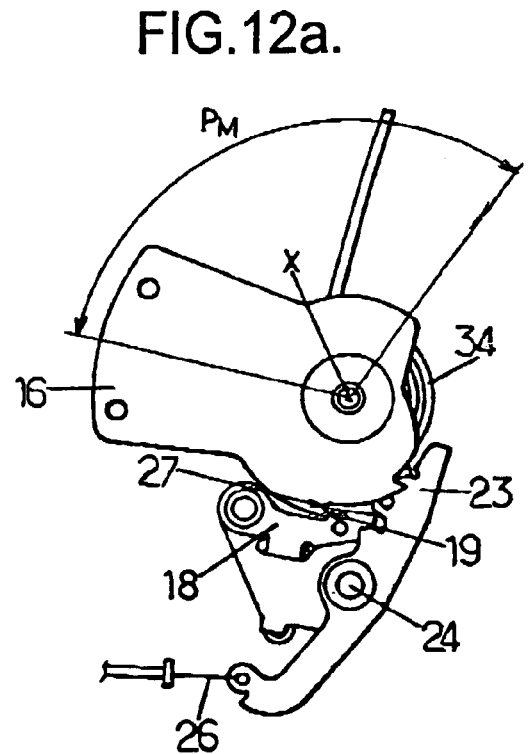
FIGS. 12a and 12b are two side views corresponding respectively to each of the faces of the blocking mechanism of the embodiment of the seat corresponding to FIGS. 10a, 10b, 11a and 11b, with the backrest in the position correspondingly being folded fully flat as depicted in FIG. 3.
Figure 12B:
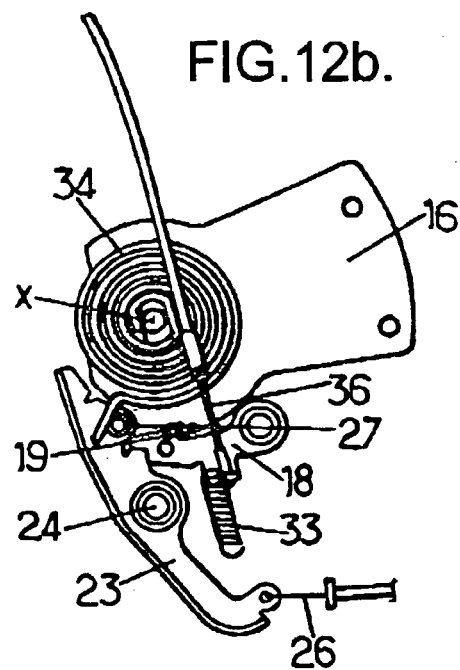

FIGS. 12a and 12b correspond to a folded-flat position of the backrest 2. To reach this position, the user stands the backrest 2 up into the comfort position, as indicated in the previous paragraph, then actuates the knob 28 which is connected by the connecting member 29b to the articulation 4 to unlock the latter and tip the backrest 2 in the direction of the arrow R (see FIG. 3) until a second stop 27 of the rotary member 16 comes into contact with the counter stop 19 of the blocking member 18. During this operation, the lever 23 remains blocked, by the blocking member 18, in its passive position in which the cable 26 is not pulled and therefore the slide rails 6 remain locked.

The backrest 2 is kept in its folded-flat position on the one hand by the action of the spring 34 which opposes a movement of the backrest 2 towards an erect position and, on the other hand, by the collaboration of the second stop 27 and of the counter stop 19 preventing the backrest 2 from rotating, towards the cushion 3, beyond the folded-flat position.

According to an alternative form of this embodiment, the control member for adjusting comfort and the control member for folding the backrest 2 down into an intermediate position are coincident. In this case, there is, for example, a single handle 5, as in the first embodiment, which can be actuated in one direction to adjust comfort and in another direction to unlock the articulation 4 and allow the backrest 2 to be tipped to gain access to the rear seats.

The third embodiment is described hereinbelow in greater detail in relation to FIGS. 1 to 3 and 13 to 17.

The seat 1 corresponding to this third embodiment comprises a backrest 2 mounted to pivot on a cushion 3 about a horizontal pivot axis X, and an articulation 4 controlled by a control member, for example a rotary handle 5 (see FIG. 1).

The cushion 3 is carried by two slide rails 6 the unlocking of which can be achieved by means of a bar 7.

The tipping of the backrest 2 with respect to the cushion 3 is controlled by a mechanism comprising an articulation 4 situated on one side of the seat 1 and a blocking mechanism 11 situated on the opposite side of the seat 1 to the articulation 4.

The control member allowing activation of the function of adjusting comfort and the control member allowing activation of the function of tipping the backrest 2 into the folded-flat position are coincident and correspond to the handle 5, but are distinct from the control member allowing activation of the function of tipping the backrest 2 into an intermediate folded-down position, which corresponds to a lever 35.

Figure 13:
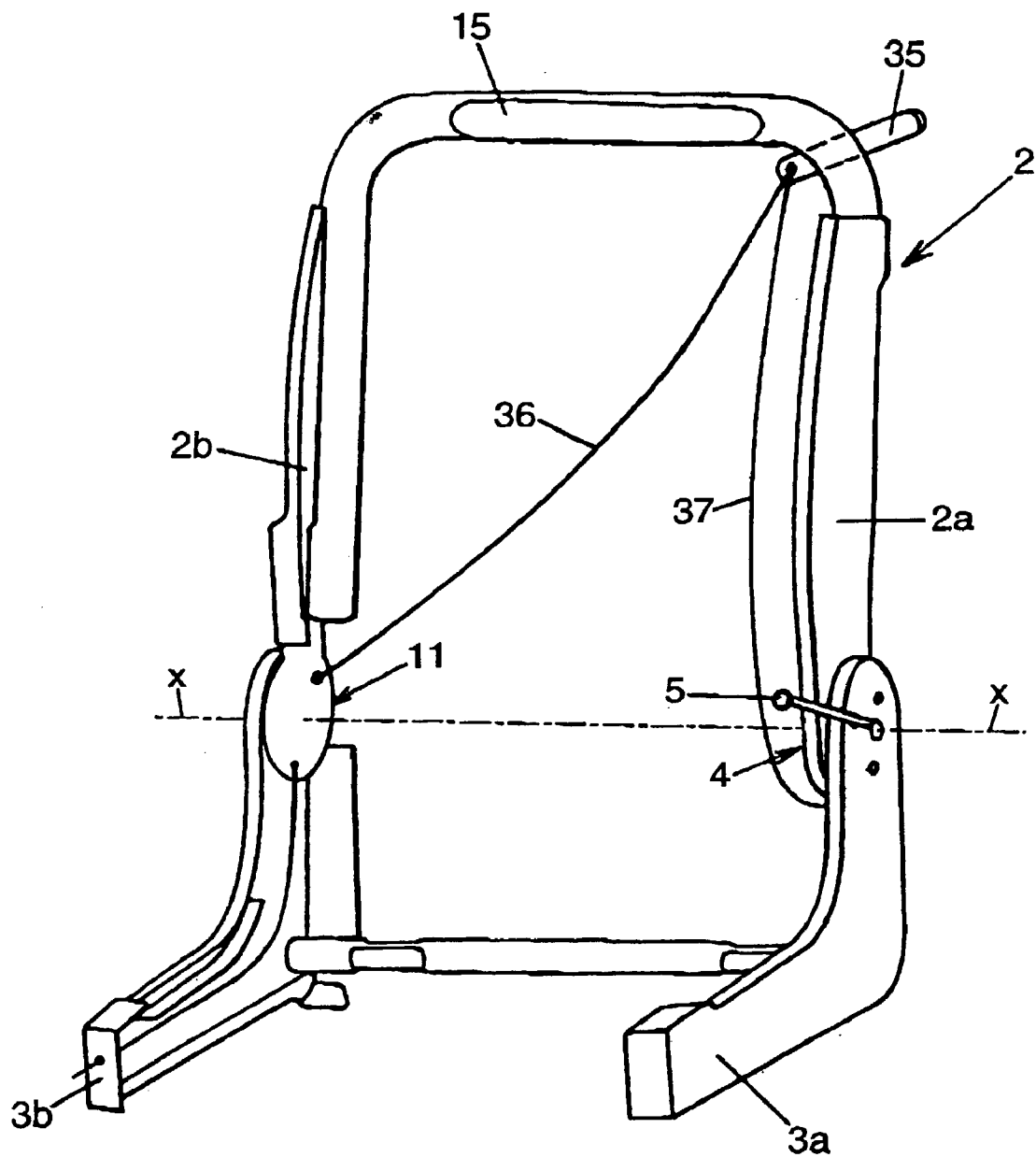
FIG. 13 is a schematic perspective view of the framework of a third embodiment of the seat according to the invention.

As depicted in FIG. 13, the articulation 4 and the blocking mechanism 11 control the rotation of first 3a, 3b side flanges, of the cushion 3, with respect to second 2a, 2b side flanges, of the backrest 2.

There is no connecting shaft between the articulation 4 and the blocking mechanism 11. However, a crosspiece 15 connects the second lateral flanges 2a, 2b together and allows these two flanges to pivot simultaneously.

The crosspiece 15 bears the lever 35 intended to project on the same side of the backrest 2 as the articulation 4 and the handle 5. The lever 35 is connected to the blocking mechanism 11 by a connecting member 36 (for example a Bowden cable) and to the articulation 4 by another connecting member 37 (for example a Bowden cable).

Figure 14:
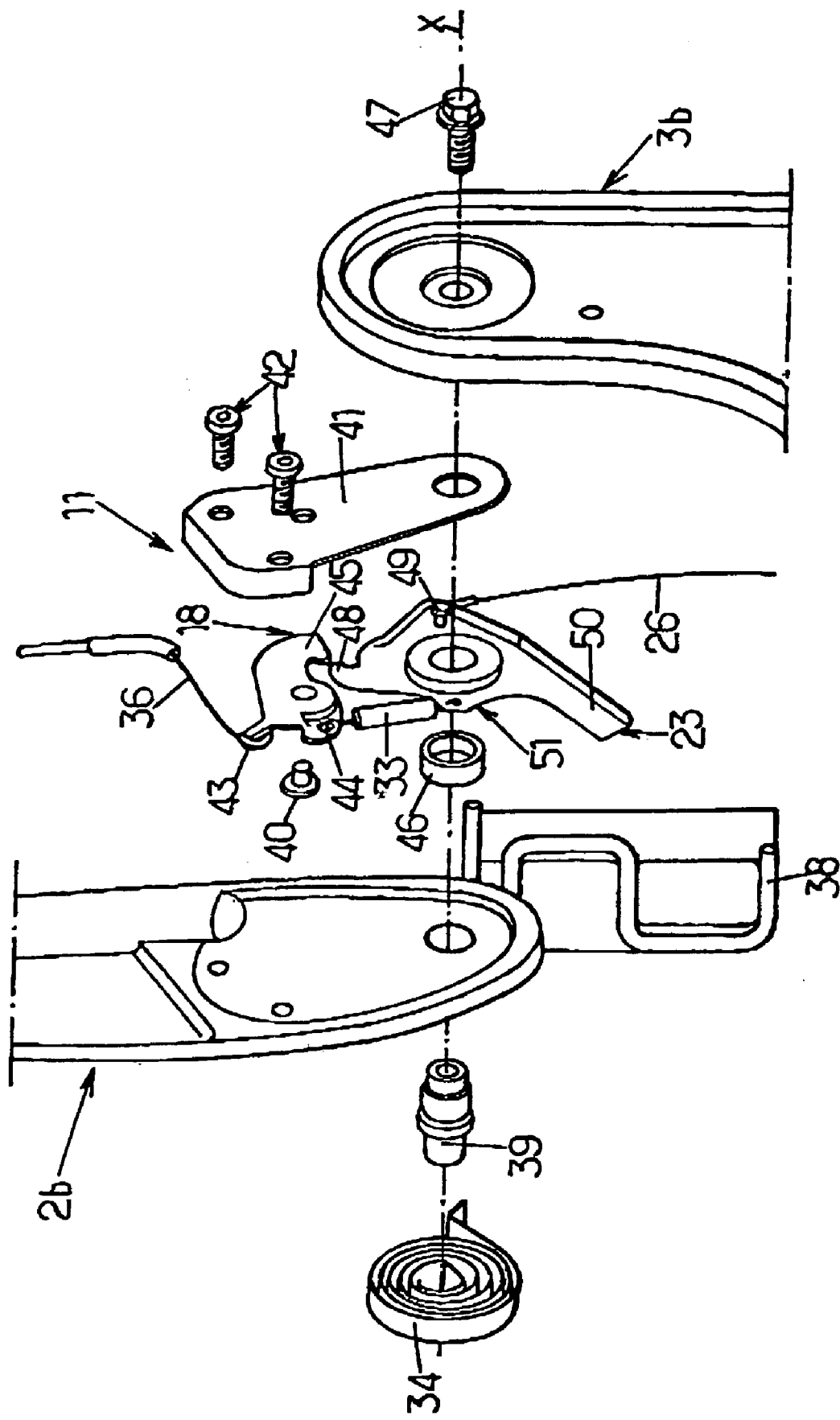
FIG. 14 depicts schematically and in an exploded view the blocking mechanism of the embodiment of the seat according to the invention depicted in FIG. 13.
Figure 15:
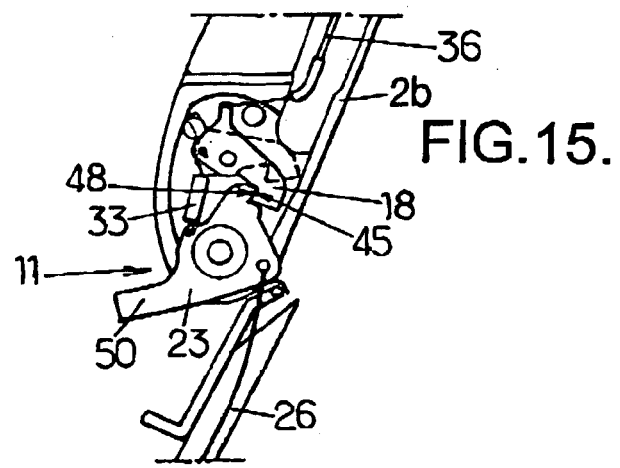
FIG. 15 depicts, in side view, the blocking mechanism of the third embodiment of the seat according to the invention depicted in FIG. 14, with the backrest in the position depicted in FIG. 1.
Figure 16:
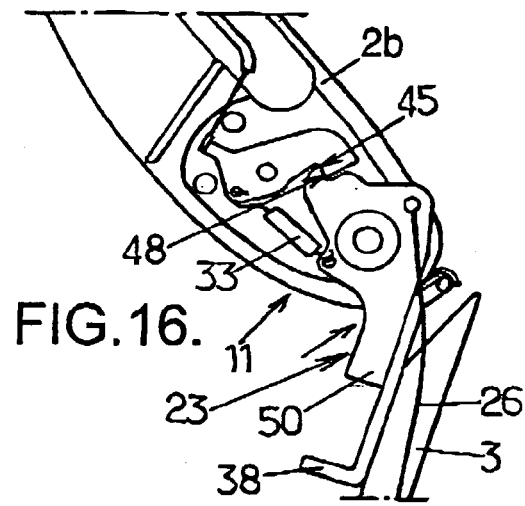
FIG. 16 depicts, in side view, the blocking mechanism of the third embodiment of the seat according to the invention, with the backrest in the position depicted in FIG. 2.
Figure 17:
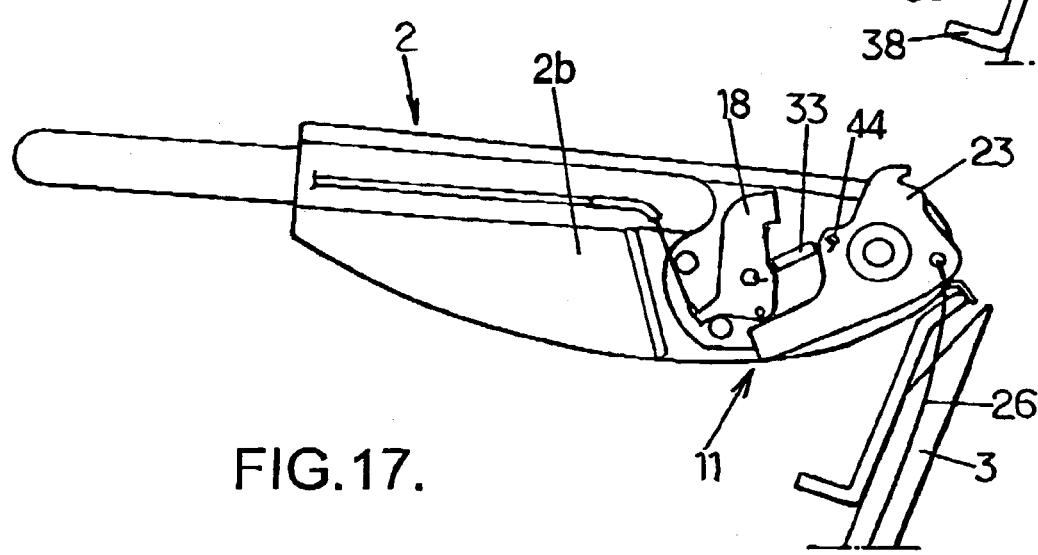
FIG. 17 depicts, in side view, the blocking mechanism of the third embodiment of the seat according to the invention, with the backrest in the position depicted in FIG. 3.

The blocking mechanism 11 of this embodiment is illustrated in detail in FIG. 14, and in FIGS. 15, 16 and 17 which correspond to various positions of the backrest 2 with respect to the cushion 3.

This blocking mechanism 11 comprises a blocking member 18 and a lever 23. The blocking member 18 and the lever 23 are both mounted to pivot on the second side flange 2b, situated on the opposite side of the seat 1 to the articulation 4.

The backrest 2 is articulated to the cushion 3 about a horizontal pivot axis X. A torsion spring 34 elastically returns the backrest 2 to the intermediate folded-down position and the folded-flat position. The spring 34 comprises an outer end resting against a stop 38 secured to the first flange 3b of the cushion 3. The inner end of the spring 34 collaborates with a pivot 39 causing the spring 34 and the backrest 2 to rotate as one.

The blocking member 18 is fixed, by a screw 40, to a plate 41 itself held on the flange 2b by screws 42. The blocking member 18 is able to pivot about a horizontal axis embodied by the screw 40. The blocking member 18 is able to move in rotation about the screw 40 between a retracted position in which it does not interact with the lever 23 and an active position in which it causes the lever 23 to rotate with the backrest 2 when the latter pivots about the pivot axis X, from a comfort position towards the intermediate folded-down position. The blocking member 18 comprises a point 43 of attachment to the connecting member 36. It also comprises, near this attachment point 43, another point 44 of attachment of a spring 33. The spring 33 returns the blocking member 18 to its retracted position.

More or less in symmetry with the attachment points 43, 44, with respect to the screw 40, the blocking member 18 has a hook 45 intended to collaborate with the lever 23.

The lever 23 is mounted so that it is free to rotate about the pivot 39 by virtue of a spacer piece 46. The lever 23 is held on the pivot 39, between the second side flange 2*b* and the plate 41. The first 3*b* and second 2*b* side flanges are held together by a screw 47 screwed into the pivot 39. The pivot 39 passes through the second side flange 2*b*, the spacer piece 46 and the lever 23.

The lever 23 comprises a hook 48 intended to collaborate with the hook 45 of the blocking member 18. The lever 23 also comprises, near the hook 48, a point 49 of attachment of the connecting member commanding the locking and unlocking of the slide rails 6. Advantageously, this connecting member is a cable 26 of the Bowden type. More or less in symmetry with the hook 48 and the attachment point 49 with respect to the articulation of the lever 23 to the pivot 39, the lever 23 has a branch 50 running more or less radially at right angles to the pivot axis X. More or less in symmetry with the attachment point 49, with respect to the pivot axis X of the cable 26, the lever 23 has an attachment point 51 for the spring 33. Thus, the spring 33 returns the blocking member 18 and the lever 23 in such a way that the hooks 45 and 48 do not collaborate with one another, if no pull is exerted on the connecting member 36.

As depicted in FIG. 15, which corresponds to the position of the backrest illustrated by FIG. 1, the spring 33 returns the blocking member 18 to a retracted position (depicted in dotted line in FIG. 15). In this configuration, the blocking mechanism 11 is disengaged and allows the second side flange 2*b* to rotate freely with respect to the first side flange 3*b* over the entire range of adjustment of comfort, in which only the articulation 4 controls the position of the backrest 2 with respect to the cushion 3. When a user actuates the lever 35 to cause the backrest 2 to tip into the intermediate folded-down position, he on the one hand unlocks the articulation 4 and, on the other hand, pulls on the connecting member 36 which causes the blocking member 18 to tip into the active position against the action of the spring 33. The unlocking of the articulation 4 allows the user to tip the backrest 2 in the direction of the arrow R (see FIG. 2). The hook 45 of the blocking member 18 therefore collaborates with the hook 48 of the lever 23. Thus, when the user tips the backrest 2 into the intermediate folded-down position, the lever 23 is made to rotate with the second side flange 2*b*. To tip the backrest 2 beyond the comfort positions towards the intermediate folded-down position, the user may release the lever 35, the articulation 4 being in a portion with free rotational stroke.

As depicted in FIG. 16, in the intermediate folded-down position, the branch 50 of the lever 23 bears against the stop 38 secured to the cushion 3. In this intermediate folded-down position, the lever 23 also pulls on the cable 26, thus unlocking the slide rails 6.

The branch 50, bearing against the stop 38, prevents the backrest 2 from pivoting into its folded-flat position.

When the backrest 2 is in the intermediate folded-down position and the user releases the lever 35, the backrest 2 remains in the intermediate folded-down position by virtue of the action of the spring 34 which returns the backrest 2 towards the folded-flat position. In the intermediate folded-down position, the hooks 45 and 48 continue to collaborate with each other even if the lever 35 is released.

Since the slide rails 6 are unlocked, the user can move the seat 1 forwards so as to open up enough space to allow access to be had to the spaces behind this seat 1.

To return the backrest 2 to the position of use, the user stands the backrest 2 up against the action of the spring 34. The lever 23 returns in the clockwise direction with the backrest 2 under the return effect of the cable 26. When the cable 26 is sufficiently relaxed, the spring 33 tends to disengage the hooks 45 and 48 from one another. The blocking member 18 can then return to the retracted position.

To tip the backrest 2 from a comfort position to the folded-flat position, the user actuates the handle 5 to unlock the articulation 4. As the lever 35 has not been operated, the blocking member 18 remains in the retracted position. Thus, as the backrest 2 is tipped forwards, from a position of use to the folded-flat position, the lever 23 is not driven. The lever 23 remains, with respect to the cushion 3, in its initial position, held in this position by the return force exerted by the cable 26. The pulling of the lever 23 on this cable 26 corresponds only to the return force of the spring 33 which remains very light, if not zero, because the blocking member remains in the retracted position and because the movement of the end of the spring 33 connected to the lever 23 corresponds more or less to an arc of a circle of constant radius about the point 44 of attachment of the spring 33 to the blocking member 18.

To return the backrest 2 from its folded-flat position to a comfort position, the user once again operates the handle 5 to unlock the articulation 4. The backrest 2 can then be stood up into the position of use, against the return force of the spring 34.

The fourth embodiment is described in greater detail hereinbelow in conjunction with FIGS. 1 to 3, 18 and 19.

According to this embodiment, the seat 1 comprises a backrest 2 mounted to pivot on a cushion 3 about a horizontal pivot axis X (see FIG. 1).

According to this embodiment, the cushion 3 is carried by two slide rails 6, which can be unlocked by means of a bar 7.

Figure 18:
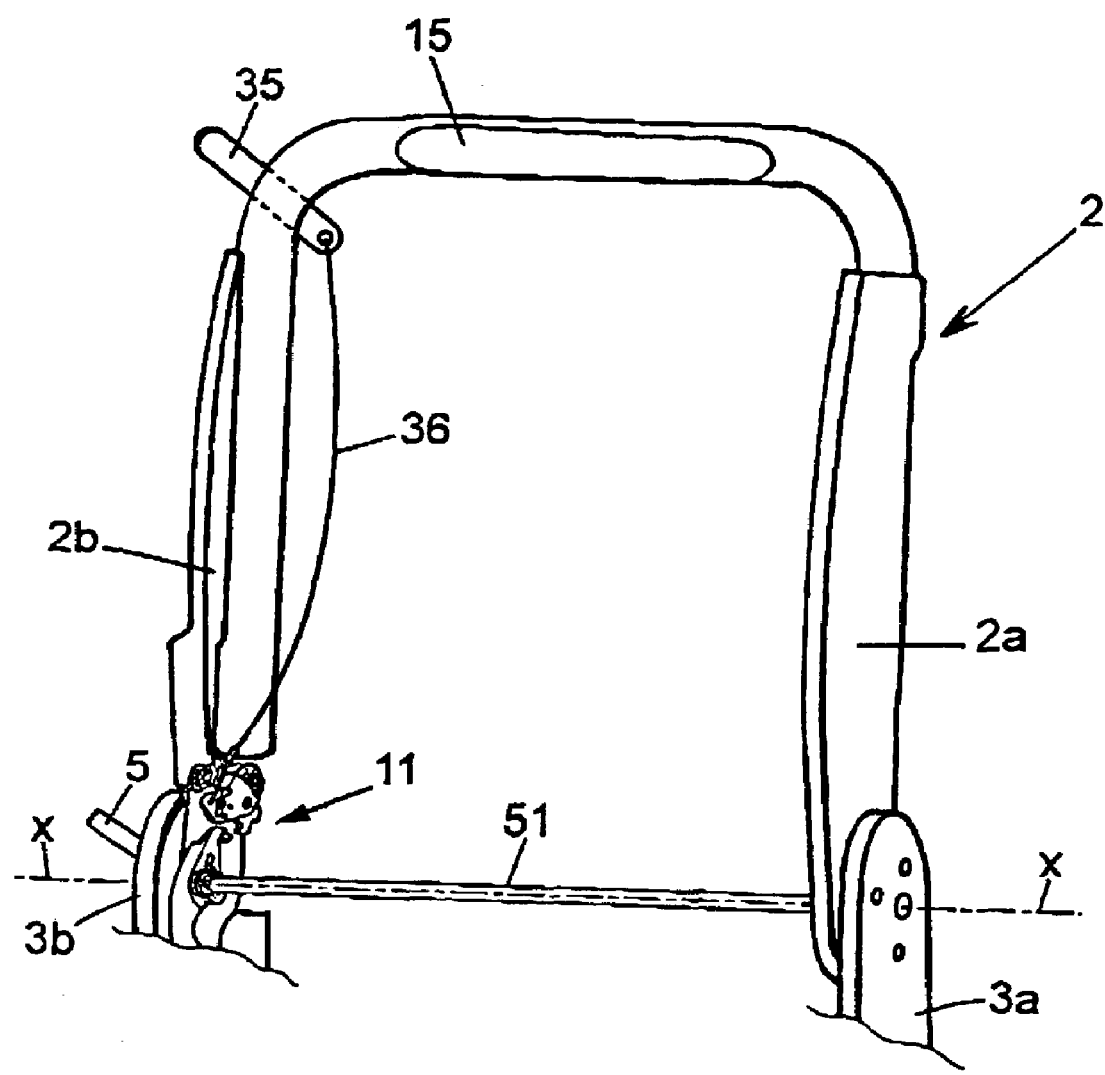
FIG. 18 is a schematic view in perspective of the framework of a fourth embodiment of the seat according to the invention.

As depicted in FIG. 18, the main metal skeleton of the cushion 3 comprises two first side flanges 3*a*, 3*b* connected respectively to second side flanges 2*a*, 2*b* which are part of the backrest 2. The first side flanges 3*a*, 3*b* rest on the slide rails 6.

The tipping of the backrest 2 with respect to the cushion 3 is controlled by a mechanism comprising an articulation 4 and a blocking mechanism 11 situated on the same side of the seat 1.

According to this embodiment, the control member allowing activation of the function of adjusting comfort and the control member allowing activation of the function of tipping the backrest 2 into the folded-flat position are coincident and correspond to a handle 5. However, they are distinct from the control member, corresponding to a lever 35, allowing activation of the function of tipping the backrest 2 into an intermediate folded-down position.

The first 3*a*, 3*b* and second 2*a*, 2*b* side flanges of the cushion 3 and of the backrest 2 are assembled in a rotary fashion about a connecting bar 51 extending longitudinally parallel to the pivot axis X.

A crosspiece 15 connects the second side flanges 2*a*, 2*b* together. The crosspiece 15 bears the lever 35, intended to project on the same side of the backrest 2 as the articulation 4 and the handle 5. The lever 35 is connected to the blocking mechanism 11 by a connecting member 36 (for example a Bowden cable).

Figure 19:
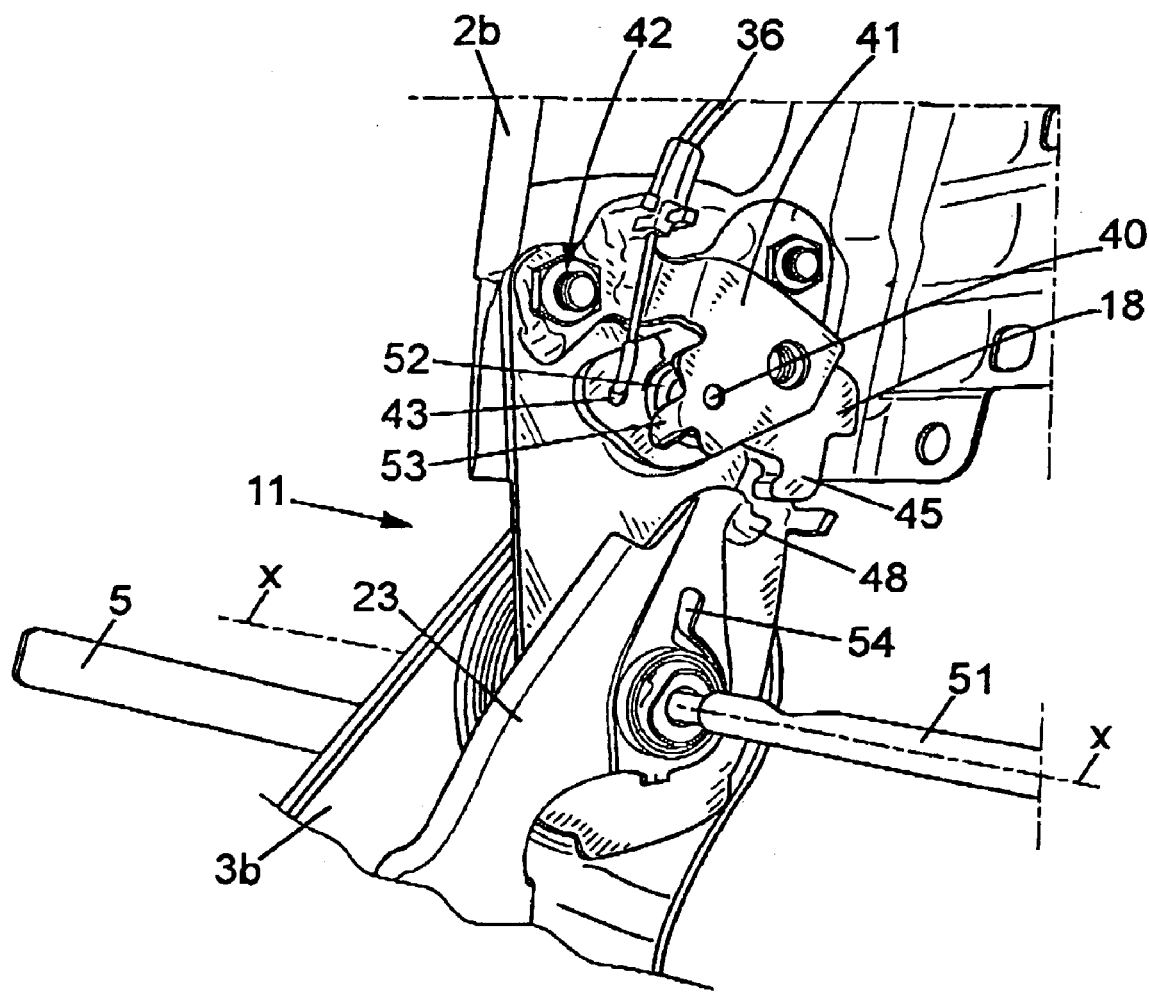
FIG. 19 depicts schematically in perspective the blocking mechanism of the embodiment of the seat according to the invention depicted in FIG. 18.

The blocking mechanism 11 in this embodiment is illustrated in detail in FIG. 19.

This blocking mechanism 11 comprises a blocking member 18 and a lever 23. The blocking member 18 and the lever 23 are both mounted to pivot on the second side flange 2b.

The blocking member 18 is fixed, by virtue of a pivot 40, on a plate 41 itself held on the flange 2b by a screw 42. The blocking member 18 is able to move in rotation on the pivot 40 about an axis roughly parallel to the pivot axis X, between a retracted position in which it does not interact with the lever 23 and an active position in which it causes the lever 23 to rotate with the backrest 2, when the latter pivots about the pivot axis X, from a comfort position towards the intermediate folded-down position. The blocking member 18 is returned elastically to its retracted position by a torsion spring 52 resting, on the one hand, against a lug 53 formed by a folded part of the plate 41, and on the other hand, on a flat of part of the blocking member 18 extending coaxially to the pivot 40 and fixed with respect to the flange 2b.

The blocking member 18 comprises a point 43 of attachment of the connecting member 36.

More or less in symmetry with the attachment point 43, with respect to the pivot 40, the blocking member 18 comprises a hook 45 intended to collaborate with the lever 23.

The lever 23 is mounted so that it is free to rotate about the connecting shaft 51 between a passive position in which it allows the slide rails to be locked and an active position in which it actuates a connecting member (not depicted) which commands the unlocking of the slide rails 6. The lever 23 comprises a hook 48 intended to collaborate with the hook 45 of the blocking member 18. The lever 23 also comprises, on the opposite side of the hook 48 with respect to the connecting shaft 51, means of attachment of the connecting member commanding the locking and unlocking of the slide rails 6. A torsion spring 54 elastically returns the lever 23 to its passive position.

In FIG. 19, the blocking mechanism 11 is depicted in the disengaged configuration. It allows the second side flange 2b to rotate freely with respect to the first side flange 3b throughout the range of adjustment of comfort and towards the folded-flat position, for both of which only the articulation 4 controls the position of the backrest 2 with respect to the cushion 3.

When a user actuates the lever 35, to tip the backrest 2 into an intermediate folded-down position, he will on the one hand unlock the articulation 4, using connecting means known to those skilled in the art and not depicted, and, on the other hand, pull on the connecting member 36.

When the connecting member 36 is taut, the blocking member 18 is moved in rotation about the pivot 40 against the return force of the torsion spring 52.

The hook 45 of the blocking member 18 then comes to face the hook 48 of the lever 23.

With the articulation 4 unlocked, all the user needs to do is to tip the backrest 2 forwards into the intermediate folded-down position in order to gain access to the rear seats of the vehicle. In this tipping movement, the blocking member 18 is driven with the flange 2b. The two hooks 45 and 48 then collaborate with one another, and this also allows the lever 23 to be driven in rotation about the pivot axis X against the return force of the torsion spring 54. In its rotation, the lever 23 pulls on the connecting member commanding the unlocking of the slide rails. 6. The rotation of the backrest 2 is delimited by the lever 23 coming into abutment on the flange 3b.

When the user returns the backrest 2 backwards, the lever 23 is returned to its passive position corresponding to FIG. 19. When the lever 23 is in the passive position, force is no longer exerted between the hooks 45 and 48. The blocking member 18 can then return, by virtue of the return force of the torsion spring 52, to a retracted position, if no more force is exerted on the connecting member 36.

The movement of the backrest 2 to the folded-flat position is performed by unlocking the articulation 4 using the handle 5 and by tipping the backrest forwards. In this tipping movement, if no action is exerted on the lever 35, the mechanism 11 remains passive and no unlocking of the slide rails occurs.

The fifth embodiment is described hereinbelow in conjunction with FIGS. 1 to 3 and 20 to 32.

The seat 1 corresponding to this embodiment comprises a backrest 2 mounted to pivot on a cushion 3 about a horizontal pivot axis X (see FIG. 1).

The cushion 3 is borne by two slide rails 6, the unlocking of which can be performed using a bar 7.

Figure 20:
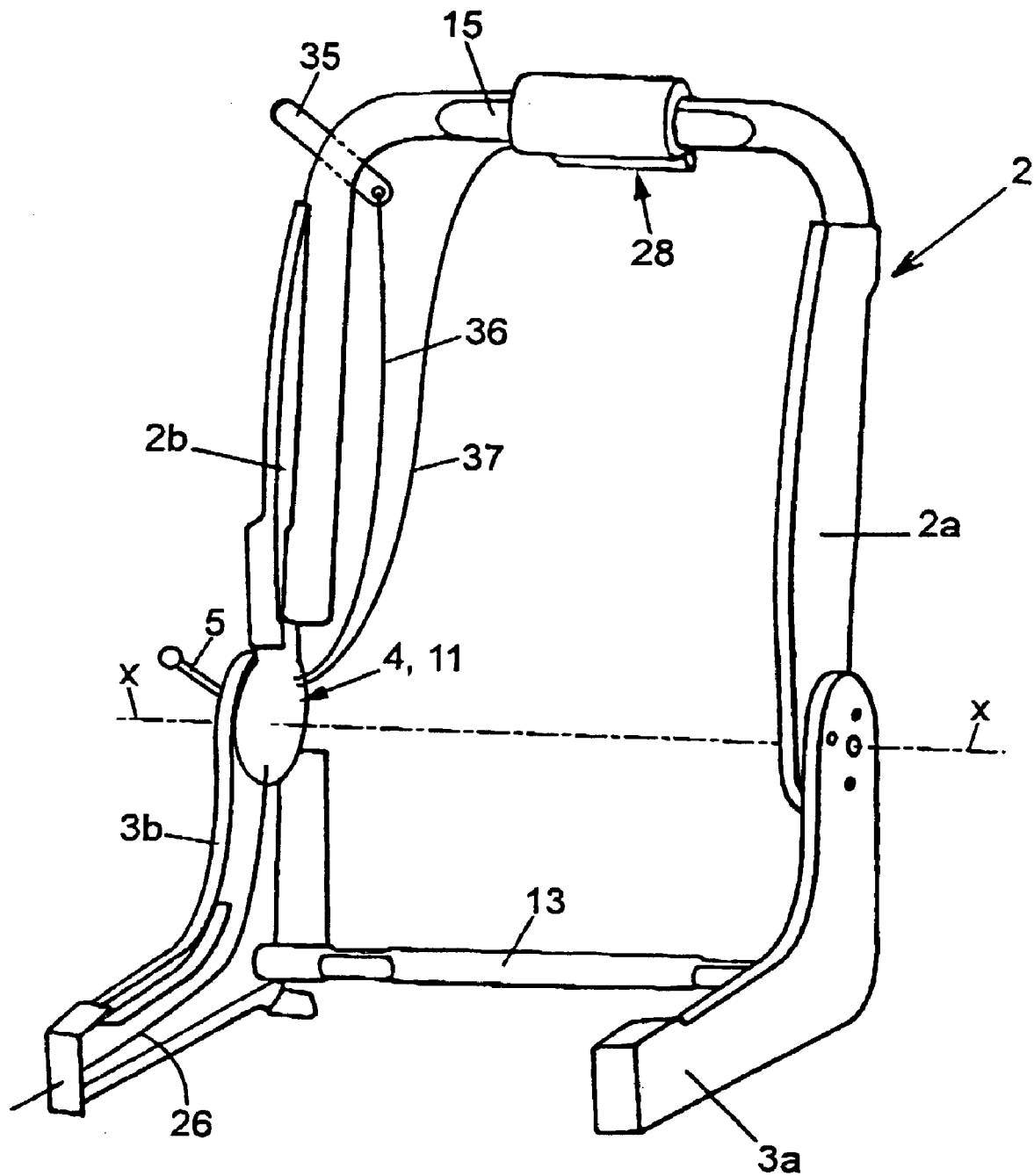
FIG. 20 is a schematic perspective view of the framework of a fifth embodiment of the seat according to the invention.

As depicted in FIG. 20, the tipping of the backrest 2, with respect to the cushion 3, is controlled by a mechanism comprising an articulation 4 and a blocking mechanism 11, both situated on the same side of the seat 1.

The control member for activation of the function of adjusting comfort, corresponding to a handle 5, the control member for activation of the function of tipping the backrest 2 into the folded-flat position, corresponding to the knob 28, and the control member for activation of the function of tipping the backrest 2 into an intermediate folded-down position, corresponding to the lever 35, are distinct from one another.

The main metal skeleton of the cushion 3 comprises two first side flanges 3a, 3b connected respectively to second side flanges 2a, 2b which form part of the backrest 2. The first side flanges 3a, 3b rest on the slide rails 6. There are no connecting shafts corresponding to the pivot axis X, but a crosspiece 15 connects the second side flanges 2a, 2b and allows these two flanges to pivot simultaneously. The two first side flanges 3a, 3b are connected together by a rear crosspiece 13.

The crosspiece 15 bears the lever 35, intended to project on the same side of the backrest 2 as the articulation 4 and the handle 5. The lever 35 is connected to the blocking mechanism 11 by a connecting member 36 (for example a Bowden cable). The crosspiece 15 also bears the knob 28 intended to project on the rear face of the backrest 2. The knob 28 is connected to the blocking mechanism 11 by a connecting member 37 (for example a Bowden cable).

Figure 21:
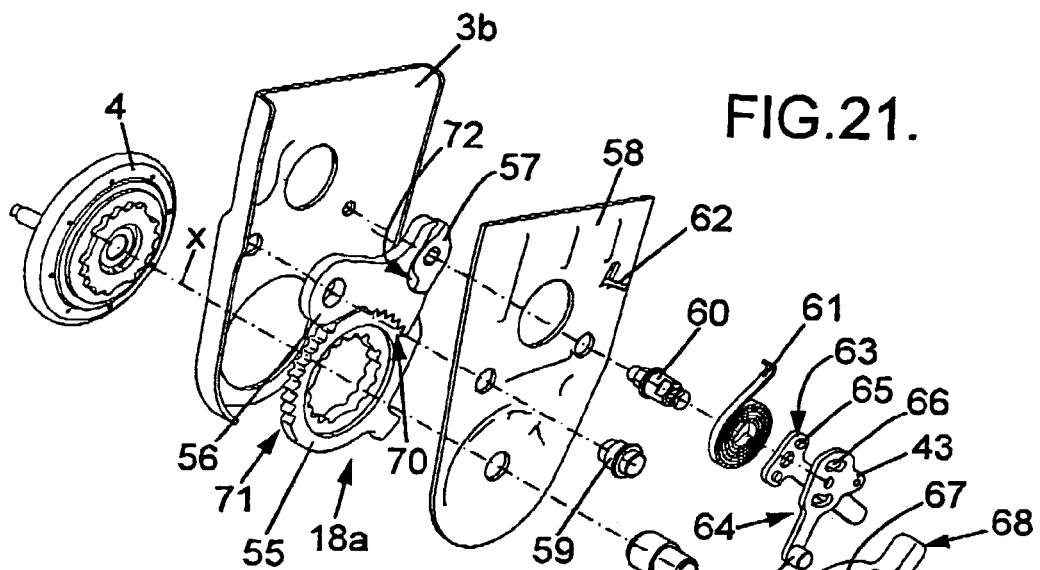
FIG. 21 depicts schematically and in an exploded view the blocking mechanism of the embodiment of the seat according to the invention depicted in FIG. 20.

The blocking mechanism 11 is illustrated in detail in FIG. 21 and in FIGS. 22 to 33 which correspond to various positions of the backrest 2 with respect to the cushion 3.

This blocking mechanism 11 comprises blocking means 18a and a lever 23. The blocking means 18a comprise a toothed disc 55, a locking hook 56 and a cam 57. The blocking means 18a are enclosed in a casing consisting of part of the side flange 2b and of a closure plate 58.

The locking hook 56 pivots about an axis roughly parallel to the pivot axis X and embodied by a hook pivot 59. The cam 57 pivots about an axis roughly parallel to the pivot axis X and embodied by a cam pivot 60. The cam pivot 60 is urged elastically by a torsion spring 61.

The torsion spring 61 is prestressed between an inner end collaborating with a flat formed on the cam pivot 60 and an outer end in abutment against a lug 62 formed on the closure plate 58.

The cam pivot 60 is actuated by a fold-flat control link 63 and an access-to-rear-seats control link 64. The fold-flat control link 63 and the access-to-rear-seats control link 64 are pressed on one another and held together on the cam pivot 60. The fold-flat control link 63 rotates as-one with the cam pivot 60. On one of its faces, the one facing the access-to-rear-seats control link 64, it has two studs 65. The access-to-rear-seats control link 64 has two cut-outs 66 running in an arc of a circle centred on the axis of rotation of the cam pivot 60. The access-to-rear-seats control link 64 is positioned, with respect to the fold-flat control link 63, in such a way that the studs 65 engage in the cut-outs 66.

The access-to-rear-seats control link 64 is free to rotate about the cam pivot 60. Thus, the angular range corresponding to the circular arc of the cut-outs 66, the fold-flat control link 63 can be actuated without, in its movement, carrying along with it the access-to-rear-seats control link 64.

The access-to-rear-seats control link 64 also comprises a boarding peg 69. This boarding peg 69 runs at right angles to the plate that makes up the access-to-rear-seats control link 64, that is to say parallel to the pivot axis X.

The fold-flat control link 63 is connected to the knob 28 by the connecting member 37. The access-to-rear-seats control link 64 is connected to the lever 35 by the connecting member 36. The access-to-rear-seats control link 64 is connected to the connecting member 36 at an attachment point 43.

The toothed disc 55 is in the form of an annulus with a notched internal surface intended to collaborate with the articulation 4 in such a way as to cause the articulation 4 and the toothed disc 55 to rotate as one. The toothed disc 55 also comprises a peripheral external surface that has two regions of notching equipped with teeth intended to collaborate with similar teeth made on the locking hook 56. These two regions of notching are a region of comfort notching 70 and a region of fold-flat notching 71, respectively.

The locking hook 56 has a sector intended to collaborate with the cam surface of the cam 57.

The lever 23 is made of sheet metal pressed to form a guide 67. The guide 67 forms, when the lever 23 is mounted on the closure plate 58, a tunnel running in an arc of a circle about the pivot axis X. One of the ends of this tunnel is widened to form a radial extension constituting a stop 68. The lever 23 is connected, at an attachment point 49, to a connecting member 26 commanding the locking or unlocking of the slide rails 6.

Figure 22:
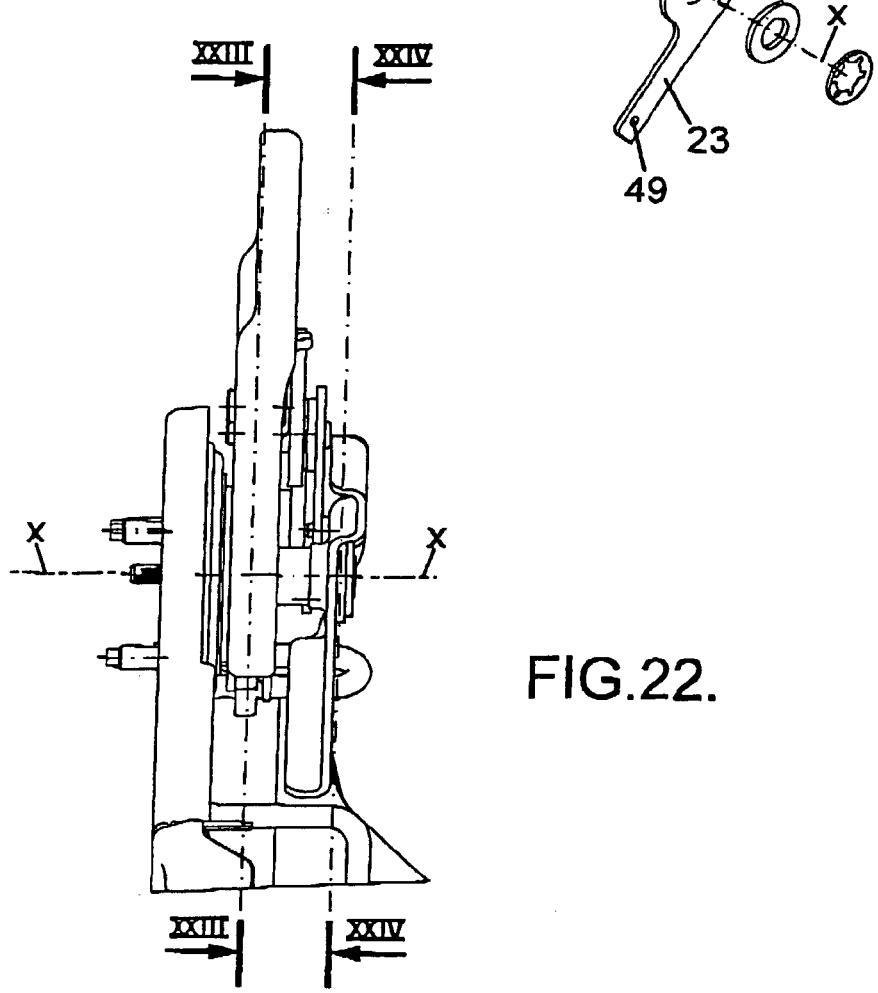
FIG. 22 depicts, face-on, the blocking mechanism of the fifth embodiment.
Figure 23:
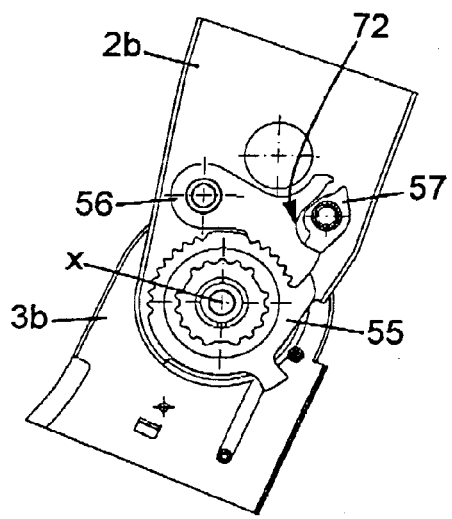
FIGS. 23 and 24 depict schematically in section the blocking mechanism depicted in FIG. 22.
Figure 24:
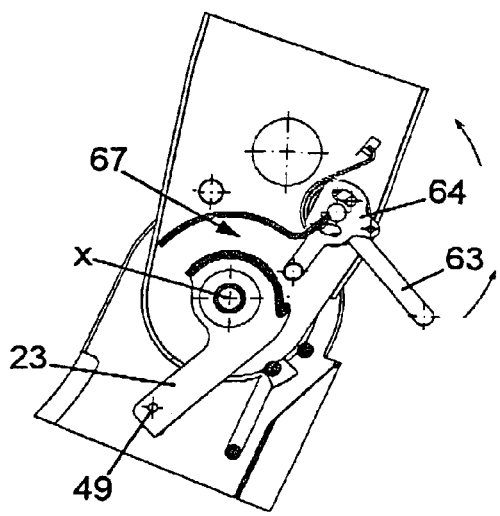

The blocking mechanism 11, as depicted in FIG. 22, once assembled, can be splitted into a stage for controlling the adjustment of comfort and folding flat, more particularly depicted in FIG. 23, and a stage for controlling access to the rear seats, more particularly depicted in FIG. 24.

Figure 25:
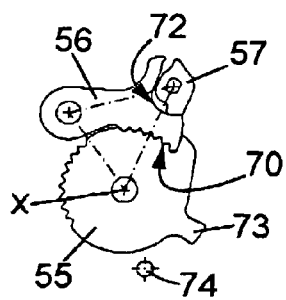
FIGS. 25, 26 and 27 depict schematically in the same way as the depiction in FIGS. 23 and 24, but in a simplified way, the movements of the main parts of the blocking mechanism of FIGS. 22 to 24, during adjustment of the comfort position.
Figure 25:
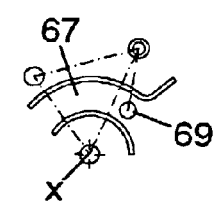
Figure 26:
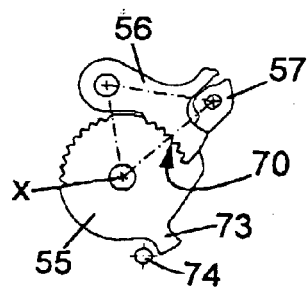
Figure 26:
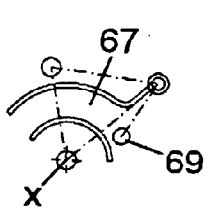
Figure 27:
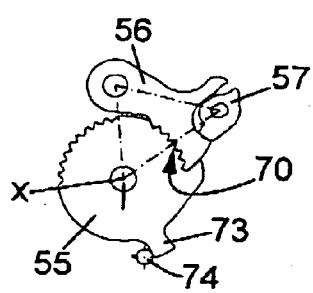
Figure 27:
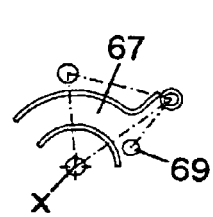

Adjustment in the comfort position is illustrated in FIGS. 25 to 27. For adjustment in the comfort position, neither the lever 35 nor the knob 28 are actuated. In consequence, the cam 57 remains fixed and collaborates with the sector of the locking hook 56, so as to keep the latter in engagement with the comfort notching region 70 of the toothed disc 55. The toothed disc 55, and the entirety of the blocking mechanism 11, then all rotate as one about the pivot axis X with the flange 2b and therefore the backrest 2. This rotational movement in the range of adjustment of comfort may be performed between a forward erect position corresponding to FIG. 25 and a backward erect position corresponding to FIG. 27, passing through intermediate positions of the type of those depicted in FIG. 26. Throughout this range of adjustment of comfort, the boarding peg 69 moves freely in the guide 67. Thus, rotation of the backrest 2 in the range of adjustment in comfort position does not lead to any movement of the lever 23. The slide rails 6 therefore remain locked.

The toothed disc 55 has a lug 73 which, in the backward erect position, collaborates with a stop 74 in position secured to the flange 3b, so as to limit the range of adjustment of comfort.

In order to pivot the backrest 2 from a comfort position to the intermediate folded-down position, the user has to actuate the lever 35. Thus, tension is exerted on the connecting member 36. This tension causes the access-to-rear-seats control link 64 to turn about the cam pivot 60. After a dead stroke of the studs 65 in the cut-outs 66, the access-to-rear-seats control link 64 also drives along the fold-flat control link 63. Thus, the movement is transmitted to the cam pivot 60 and to the cam 57.

As illustrated in FIGS. 28 to 30, in its movement, the cam 57 interacts with the sector 72 of the locking hook 56 in such a way as to disengage it from the comfort notching region 70. The blocking mechanism 11 and the backrest 2 are therefore dissociated from the articulation 4. The user can therefore tip the backrest 2 towards the intermediate folded-down position. However, in the rotational movement of the access-to-rear-seats control link 64 about the cam pivot 60, the boarding peg 69 has been moved. The path of the boarding peg 69, as the backrest 2 tips towards the intermediate folded-down position, is outside the tunnel of the guide 67. The boarding peg 69 therefore collaborates, when the backrest 2 is in the intermediate folded-down position, with the stop 68 (FIG. 29).

The boarding peg 69 thus in its rotation carries with it the lover 23. The latter, in its movement, pulls on the connecting member 26, thus allowing the slide rails 6 to be unlocked.

In the intermediate folded-down position, the lever 23 is in abutment against the flange 3b of the cushion 3.

It may be noted that, in the intermediate folded-down position, the locking hook 56 rests on a non-notched region of the toothed disc 55 lying between the comfort notching region 70 and the fold-flat notching region 71.

Return to a comfort position takes place by tipping the backrest 2 backwards, without necessarily manipulating the lever 35, reengagement of the locking hook 56 with the toothed disc 55 and therefore securing to the articulation 4 occurring only when no tooth of the locking hook 56 is resting on the non-notched region of the toothed disc 55.

The folding-flat of the backrest 2 is illustrated by FIGS. 31 to 33. To tip the backrest 2 from a comfort position to the folded-flat position, the user actuates the knob 28. This knob tensions the connecting member 37. This tension causes the fold-flat control link 63 to rotate, with the cam pivot 60 and the cam 57. By contrast, by virtue of the cut-outs 66, in this rotation of the fold-flat control link 63, the access-to-rear-seats control link 64 is not carried along.

The cam 57 interacts with the sector 72 of the locking hook 56 in such a way as to disengage the teeth of the latter from the comfort notching region 70 of the toothed disc 55. The user can then tip the backrest 2 forwards, into the folded-flat position. Since the access-to-rear-seats control link 64 has not been carried along with the fold-flat control link 63, the boarding peg 69 follows a stroke, while the backrest 2 is tipping about the pivot axis X into the folded-flat position, that is inside the guide 67.

At the end of the stroke, depicted in FIG. 32, the knob 28 is released and the locking hook 56 once again collaborates with the toothed disc 55, its teeth being engaged in both of the fold-flat notching region 71.

If, through inadvertence, when the backrest 2 is in the folded-flat position, the user actuates the lever 35, the boarding peg 69 remains blocked, as depicted in FIG. 33, in the guide 67. The access-to-rear-seats control link 64 cannot therefore be actuated and disengagement of the locking hook 56 from the toothed disc 55 cannot be performed unless the knob 28 is manipulated again. Thus, the lever 23 does not pivot and the slide rails 6 are not unlocked.

What is claimed is:

1. Vehicle seat comprising:
   a cushion intended to be connected to a floor of the vehicle by slide rails,
   a backrest mounted to pivot with respect to the cushion about a single horizontal pivot axis between a folded-flat position in which the backrest runs roughly horizontally parallel to the cushion and a plurality of comfort position in which the backrest extends roughly vertically and allows its user to sit in the seat, this comfort position lying in a range extending angularly between a rear erect position and a forward erect position of the backrest, the backrest being roughly perpendicular to the cushion when in the forward erect position, the backrest being at an obtuse angle with respect to the cushion when in the rear erect position,
   a mechanism for controlling the pivoting of the backrest about said pivot axis with respect to the cushion comprising an articulation that can be actuated between an unlocked state that allows the backrest to rotate freely with respect to the cushion about the pivot axis and a locked state in which the rotation of the backrest with respect to the cushion is blocked in one of the plurality of comfort positions, this mechanism being designed to perform the three functions consisting in:
   commanding the articulation to adjust the backrest into one of the plurality of the comfort positions, by rotating the backrest about said pivot axis within said range extending between the rear erect position and the forward erect position,
   commanding a tilting of the backrest by rotating it about said pivot axis towards the folded-flat position, and
   commanding a tilting of the backrest by rotating it about said pivot axis into an intermediate folded-down position between one of the adjusted comfort positions and the folded-flat position, the backrest pivoting between the folded-flat position, the intermediate folded-down position, and each of the plurality of comfort positions about the single pivot connecting the backrest to the cushion, no other pivots being provided between the backrest and the cushion to allow for such movement therebetween,
   at least two control members separate from one another and acting on the control mechanism so as each to activate at least one of the three aforementioned functions, and a blocking mechanism itself comprising:
   a rotary member, secured to a first seat element chosen from the backrest and the cushion, and
   a blocking member, actuated by a transmission member and mounted to move on a second seat element, chosen from the cushion and the backrest, different from the one to which the rotary member is secured, the blocking member being movable between, on the one hand, an active position in which it comes into contact with a first stop of the rotary member when the backrest is in the intermediate folded-down position, preventing the backrest from pivoting towards its folded-flat position and, on the other hand, a retracted position in which it no longer interferes with the first stop, the blocking member being urged elastically towards its active position.

2. Seat according to claim 1, in which the blocking member is designed to engage with the rotary member, immobilizing the backrest with respect to the cushion when the backrest is in its folded-flat position.

3. Seat according to claim 1, in which the control member activating the tipping of the backrest towards the folded-flat position and the control member activating the tipping of the backrest in the intermediate folded-down position are separate from one another.

4. Seat according to claim 1, in which the control member activating the tipping of the backrest towards the intermediate folded-down position is mounted on a location chosen between the articulation and the top of the backrest.

5. Seat according to claim 1, in which one of the control members is able to actuate a blocking mechanism situated on the other side of the seat to the articulation.

6. A vehicle seat, comprising:
   a cushion intended to be connected to a floor of the vehicle by slide rails,
   a backrest mounted to pivot with respect to the cushion about a single horizontal pivot axis between a folded-flat position in which the backrest runs roughly horizontally parallel to the cushion and a plurality of comfort position in which the backrest extends roughly vertically and allows its user to sit in the seat, this comfort position lying in a range extending angularly between a rear erect position and a forward erect position of the backrest,
   a mechanism for controlling the pivoting of the backrest about said pivot axis with respect to the cushion comprising an articulation that can be actuated between an unlocked state that allows the backrest to rotate freely with respect to the cushion about the pivot axis and a locked state in which the rotation of the backrest with respect to the cushion is blocked in one of the plurality of comfort positions, this mechanism being designed to perform the three functions consisting in:
   commanding the articulation to adjust the backrest into one of the plurality of the comfort positions, by rotating the backrest about said pivot axis within said range extending between the rear erect position and the forward erect position.
   commanding a tilting of the backrest by rotating it about said pivot axis towards the folded-flat position, and
   commanding a tilting of the backrest by rotating it about said pivot axis into an intermediate folded-down position between one of the adjusted comfort positions and the folded-flat position,
   at least two control members separate from one another and acting on the control mechanism so as each to activate at least one of the three aforementioned functions, and
   a blocking mechanism itself comprising:
   a rotary member, secured to a first seat element chosen from the backrest and the cushion, and
   a blocking member, actuated by a transmission member and mounted to move on a second seat element, chosen from the cushion and the backrest, different from the one to which the rotary member is secured, the blocking member being movable between, on the one hand, an active position in which it comes into contact with a first stop of the rotary member when the backrest is in the intermediate folded-down position, preventing the backrest from pivoting towards its folded-flat position and, on the other hand, a retracted position in which it no longer interferes with the first stop, the blocking member being urged elastically towards its active position in which the rotary member comprises a cam surface designed to actuate a lever, itself designed to lock or unlock the slide rails, and which is mounted to move on the backrest between an active position in which the lever unlocks the slide rails, and a passive position in which the lever allows the slide rails to be locked.

7. Seat according to claim 6, in which the lever is urged elastically towards its passive position and the cam surface is designed to move the lever into its active position when the backrest is in its intermediate folded-down position.

8. Seat according to claim 7, in which the lever is able to hold the blocking member in its active position, when the backrest is in its intermediate folded-down position.

9. Vehicle seat comprising:
a cushion intended to be connected to a floor of the vehicle by slide rails,
a backrest mounted to pivot with respect to the cushion about a single horizontal pivot axis between a folded-flat position in which the backrest runs roughly horizontally parallel to the cushion and a plurality of comfort positions in which the backrest extends roughly vertically and allows its user to sit in the seat, this comfort position lying in a range extending angularly between a rear erect position and a forward erect position of the backrest, the backrest being roughly perpendicular to the cushion when in the forward erect position, the backrest being at an obtuse angle with respect to the cushion when in the rear erect position,
a mechanism for controlling the pivoting of the backrest about said pivot axis with respect to the cushion comprising an articulation that can be actuated between an unlocked state that allows the backrest to rotate freely with respect to the cushion about the pivot axis and a locked state in which the rotation of the backrest with respect to the cushion is blocked in one of the plurality of comfort position, this mechanism being designed to perform the three functions consisting in:
commanding the articulation to adjust the backrest into one of the plurality of the comfort positions, by rotating the backrest about said pivot axis within said range extending between the rear erect position and the forward erect position,
commanding a tilting of the backrest by rotating it about said pivot axis towards the folded-flat position, and
commanding a tilting of the backrest by rotating it about said pivot axis into an intermediate folded-down position between one of the adjusted comfort positions and the folded-flat position, the backrest pivoting between the folded-flat position, the intermediate folded-down position, and each of the plurality of comfort positions about the single pivot connecting the backrest to the cushion, no other pivots being provided between the backrest and the cushion to allow for such movement therebetween,
at least two control members separate from one another and acting on the control mechanism so as each to activate at least one of the three aforementioned functions, and
a blocking mechanism itself comprising:
a rotary member, secured to a first seat element chosen from the backrest and the cushion, and
a blocking member, mounted to move on a second seat element, chosen from the cushion and the backrest, different from the one to which the rotary member is secured, the blocking member being movable between, on the one hand, an active position in which it comes into contact with a first stop of the rotary member when the backrest is in the intermediate folded-down position, preventing the backrest from pivoting towards its folded-flat position and, on the other hand, a retracted position in which it no longer interferes with the first stop, the blocking member being urged elastically towards its retracted position.

10. Seat according to claim 9, in which the blocking member is designed to engage with the rotary member, immobilizing the backrest with respect to the cushion when the backrest is in its folded-flat position.

11. A vehicle seat, comprising:
a cushion intended to be connected to a floor of the vehicle by slide rails,
a backrest mounted to pivot with respect to the cushion about a single horizontal pivot axis between a folded-flat position in which the backrest runs roughly horizontally parallel to the cushion and a plurality of comfort positions in which the backrest extends roughly vertically and allows its user to sit in the seat, this comfort position lying in a range extending angularly between a rear erect position and a forward erect position of the backrest,
a mechanism for controlling the pivoting of the backrest about said pivot axis with respect to the cushion comprising an articulation that can be actuated between an unlocked state that allows the backrest to rotate freely with respect to the cushion about the pivot axis and a locked state in which the rotation of the backrest with respect to the cushion is blocked in one of the plurality of comfort position, this mechanism being designed to perform the three functions consisting in:
commanding the articulation to adjust the backrest into one of the plurality of the comfort positions, by rotating the backrest about said pivot axis within said range extending between the rear erect position and the forward erect position,
commanding a tilting of the backrest by rotating it about said pivot axis towards the folded-flat position, and
commanding a tilting of the backrest by rotating it about said pivot axis into an intermediate folded-down position between one of the adjusted comfort positions and the folded-flat position,
at least two control members separate from one another and acting on the control mechanism so as each to activate at least one of the three aforementioned functions, and
a blocking mechanism itself comprising:
a rotary member, secured to a first seat element chosen from the backrest and the cushion, and
a blocking member, mounted to move on a second seat element, chosen from the cushion and the backrest, different from the one to which the rotary member is secured, the blocking member being movable between, on the one hand, an active position in which it comes into contact with a first stop of the rotary member when the backrest is in the intermediate folded-down position, preventing the backrest from pivoting towards its folded-flat position and, on the other hand, a retracted position in which it no longer interferes with the first stop, the blocking member being urged elastically towards its retracted position in which the rotary member comprises a cam surface designed to actuate a lever, itself designed to lock or unlock the slide rails, and which is mounted to move on the backrest between an active position in which the lever unlocks the slide rails, and a passive position in which the lever allows the slide rails to be locked.

12. Seat according to claim 11, in which the lever is urged elastically toward its active position and the cam surface is designed to move the lever into its passive position when the backrest is in an adjusted comfort position or in its folded-flat position.

13. Seat according to claim 12, in which the lever is able to hold the blocking member in its active position, when the backrest is in its intermediate folded-down position.

14. A vehicle seat, comprising:
a cushion intended to be connected to a floor of the vehicle by slide rails,
a backrest mounted to pivot with respect to the cushion about a single horizontal pivot axis between a folded-flat position in which the backrest runs roughly horizontally parallel to the cushion and a plurality of comfort positions in which the backrest extends roughly vertically and allows its user to sit in the seat, this comfort position lying in a range extending angularly between a rear erect position and a forward erect position of the backrest,
a mechanism for controlling the pivoting of the backrest about said pivot axis with respect to the cushion comprising an articulation that can be actuated between an unlocked state that allows the backrest to rotate freely with respect to the cushion about the pivot axis and a locked state in which the rotation of the backrest with respect to the cushion is blocked in one of the plurality of comfort positions, this mechanism being designed to perform the three functions consisting in:
commanding the articulation to adjust the backrest into one of the plurality of the comfort positions, by rotating the backrest about said pivot axis within said range extending between the rear erect position and the forward erect position.
commanding a tilting of the backrest by rotating it about said pivot axis towards the folded-flat position, and
commanding a tilting of the backrest by rotating it about said pivot axis into an intermediate folded-down position between one of the adjusted comfort positions and the folded-flat position,
at least two control members separate from one another and acting on the control mechanism so as each to activate at least one of the three aforementioned functions, and
a blocking mechanism itself comprising:
a rotary member, secured to a first seat element chosen from the backrest and the cushion, and
a blocking member, mounted to move on a second seat element, chosen from the cushion and the backrest, different from the one to which the rotary member is secured, the blocking member being movable between, on the one hand, an active position in which it comes into contact with a first stop of the rotary member when the backrest is in the intermediate folded-down position, preventing the backrest from pivoting towards its folded-flat position and, on the other hand, a retracted position in which it no longer interferes with the first stop, the blocking member being urged elastically towards its retracted position in which the control member activating the tipping of the backrest towards the folded-flat position and the control member activating the tipping of the backrest in the intermediate folded-down position are separate from one another.

15. A vehicle seat, comprising:
a cushion intended to be connected to a floor of the vehicle by slide rails,
a backrest mounted to pivot with respect to the cushion about a single horizontal pivot axis between a folded-flat position in which the backrest runs roughly horizontally parallel to the cushion and a plurality of comfort position in which the backrest extends roughly vertically and allows its user to sit in the seat, this comfort position lying in a range extending angularly between a rear erect position and a forward erect position of the backrest,
a mechanism for controlling the pivoting of the backrest about said pivot axis with respect to the cushion comprising an articulation that can be actuated between an unlocked state that allows the backrest to rotate freely with respect to the cushion about the pivot axis and a locked state in which the rotation of the backrest with respect to the cushion is blocked in one of the plurality of comfort position, this mechanism being designed to perform the three functions consisting in:
commanding the articulation to adjust the backrest into one of the plurality of the comfort positions, by rotating the backrest about said pivot axis within said range extending between the rear erect position and the forward erect position,
commanding a tilting of the backrest by rotating it about said pivot axis towards the folded-flat position, and
commanding a tilting of the backrest by rotating it about said pivot axis into an intermediate folded-down position between one of the adjusted comfort positions and the folded-flat position,
at least two control members separate from one another and acting on the control mechanism so as each to activate at least one of the three aforementioned functions, and
a blocking mechanism itself comprising:
a rotary member, secured to a first seat element chosen from the backrest and the cushion, and
a blocking member, mounted to move on a second seat element, chosen from the cushion and the backrest, different from the one to which the rotary member is secured, the blocking member being movable between, on the one hand, an active position in which it comes into contact with a first stop of the rotary member when the backrest is in the intermediate folded-down position, preventing the backrest from pivoting towards its folded-flat position and, on the other hand, a retracted position in which it no longer interferes with the first stop, the blocking member being urged elastically towards its retracted position in which the control member activating the tipping of the backrest towards the intermediate folded-down position is mounted on a location chosen between the articulation and the top of the backrest.

16. Vehicle seat comprising:
a cushion intended to be connected to a floor of the vehicle by slide rails,
a backrest mounted to pivot with respect to the cushion about a single horizontal pivot axis between a folded-flat position in which the backrest runs roughly horizontally parallel to the cushion and a plurality of comfort position in which the backrest extends roughly vertically and allows its user to sit in the seat, this comfort position lying in a range extending angularly between a rear erect position and a forward erect position of the backrest, the backrest being roughly perpendicular to the cushion when in the forward erect position, the backrest being at an obtuse angle with respect to the cushion when in the rear erect position, a mechanism for controlling the pivoting of the backrest about said pivot axis with respect to the cushion comprising an articulation that can be actuated between an unlocked state that allows the backrest to rotate freely with respect to the cushion about the pivot axis and a locked state in which the rotation of the backrest with respect to the cushion is blocked in one of the plurality of comfort positions, this mechanism being designed to perform the three functions consisting in:

commanding the articulation to adjust the backrest into one of the plurality of the comfort positions, by rotating the backrest about said pivot axis within said range extending between the rear erect position and the forward erect position, commanding a tilting of the backrest by rotating it about said pivot axis towards the folded-flat position, and commanding a tilting of the backrest by rotating it about said pivot axis into an intermediate folded-down position between one of the adjusted comfort positions and the folded-flat position, the backrest pivoting between the folded-flat position, the intermediate folded-down position, and each of the plurality of comfort positions about the single pivot connecting the backrest to the cushion, no other pivots being provided between the backrest and the cushion to allow for such movement therebetween, at least two control members separate from one another and acting on the control mechanism so as each to activate at least one of the three aforementioned functions, and a blocking mechanism which pivots as one with the backrest in its pivoting about said pivot axis.

17. Seat according to claim 16, comprising a blocking member and a lever, both mounted to pivot on the backrest, the blocking member being controlled via the control member activating the tipping of the backrest in the intermediate folded-down position, between a retracted position, in which it does not interact with the lever, and an active position in which it causes the lever to rotate with the backrest when the latter pivots about said pivot axis from one of the plurality of comfort positions to the intermediate folded-down position.

18. Seat according to claim 17, in which the lever blocks the rotation of the backrest in the intermediate folded-down position when it pivots towards the folded-flat position, resting against an element secured to the cushion.

19. Seat according to claim 16, in which the blocking member is returned by first elastic means toward a retracted position in which it does not interact with the lever, and the lever is returned by second elastic means, independent of the first elastic means, to a passive position in which it does interact with the blocking member and allows the slide rails to be locked.

20. Seat according to claim 16, in which the control member activating the tipping of the backrest toward the folded-flat position and the control member activating the tipping of the backrest in the intermediate folded-down position are separate from one another.

21. Seat according to claim 16, in which the control member activating the tipping of the backrest toward the intermediate folded-down position is mounted on a location chosen between the articulation and the top of the backrest.

22. Seat according to claim 16, in which one of the control members is able to actuate a blocking mechanism situated on the other side of the seat to the articulation.

23. Seat according to claim 16, in which the control member activating the tipping of the backrest toward the folded-flat position and the control member controlling the articulation are coincident.

24. Seat according to claim 16, in which the blocking mechanism comprises a lever mounted to pivot on the backrest designed to command the locking and unlocking of the slide rails.

25. Seat according to claim 16, in which the lever comprises guide means designed so that the lever is driven toward its active position in which it causes the unlocking of the slide rails, in the rotation of the backrest from a comfort position towards the intermediate folded-down position so as to prevent the unlocking of the slide rails when the backrest is in the folded-flat position.

26. A vehicle seat, comprising:

a cushion intended to be connected to a floor of the vehicle by slide rails, a backrest mounted to pivot with respect to the cushion about a single horizontal pivot axis between a folded-flat position in which the backrest runs roughly horizontally parallel to the cushion and a plurality of comfort positions in which the backrest extends roughly vertically and allows its user to sit in the seat, this comfort position lying in a range extending angularly between a rear erect position and a forward erect position of the backrest, a mechanism for controlling the pivoting of the backrest about said pivot axis with respect to the cushion comprising an articulation that can be actuated between an unlocked state that allows the backrest to rotate freely with respect to the cushion about the pivot axis and a locked state in which the rotation of the backrest with respect to the cushion is blocked in one of the plurality of comfort position, this mechanism being designed to perform the three functions consisting in:

commanding the articulation to adjust the backrest into one of the plurality of the comfort positions, by rotating the backrest about said pivot axis within said range extending between the rear erect position and the forward erect position, commanding a tilting of the backrest by rotating it about said pivot axis towards the folded-flat position, and commanding a tilting of the backrest by rotating it about said pivot axis into an intermediate folded-down position between one of the adjusted comfort positions and the folded-flat position, at least two control members separate from one another and acting on the control mechanism so as each to activate at least one of the three aforementioned functions, and a blocking mechanism which pivots as one with the backrest in its pivoting about the pivot axis;

a blocking member and a lever, both mounted to pivot on the backrest, the blocking member being controlled by the control member activating the tipping of the backrest in the intermediate folded-down position, between a retracted position, in which it does not interact with the lever, and an active position in which it causes a lever to rotate with the backrest when the ladder pivots about the pivot access from a comfort position to the intermediate folded-down position, in which the lever, when driven by the blocking member in the pivoting of the backrest from one of the plurality of comfort position to the intermediate folded-down position, commands the unlocking of the slide rails.

* * * * *